US009987639B2

(12) United States Patent
Russell et al.

(10) Patent No.: US 9,987,639 B2
(45) Date of Patent: Jun. 5, 2018

(54) IRRIGATION NOZZLE ASSEMBLY AND METHOD

(71) Applicant: DLHBOWLES, INC., Canton, OH (US)

(72) Inventors: Gregory Russell, Catonsville, MD (US); Shridhar Gopalan, Westminster, MD (US); Christopher South, Washington, DC (US); Russell Hester, Odenton, MD (US); Eric Koehler, Woodstock, MD (US); Kerrie Allen, Greenbelt, MD (US); Srinivasaiah Sridhara, Ellicott City, MD (US)

(73) Assignee: DLHBOWLES, INC., Canton, OH (US)

( * ) Notice: Subject to any disclaimer, the term of this patent is extended or adjusted under 35 U.S.C. 154(b) by 0 days. days.

(21) Appl. No.: 14/535,557

(22) Filed: Nov. 7, 2014

(65) Prior Publication Data

US 2015/0102126 A1 Apr. 16, 2015

Related U.S. Application Data

(62) Division of application No. 12/314,242, filed on Dec. 5, 2008, now Pat. No. 9,776,195.
(Continued)

(51) Int. Cl.

*B05B 1/02* (2006.01)
*B05B 1/08* (2006.01)

(Continued)

(52) U.S. Cl.
CPC ................ *B05B 1/02* (2013.01); *A01G 25/00* (2013.01); *B05B 1/08* (2013.01); *B05B 1/304* (2013.01);
(Continued)

(58) Field of Classification Search
CPC .. B05B 1/08; B05B 15/10; B05B 1/02; B05B 1/14; B05B 1/304; B05B 15/065; B60S 1/52; F15C 1/22; A01G 25/00
(Continued)

(56) References Cited

U.S. PATENT DOCUMENTS 3,185,166 A 5/1965 Horton
3,432,102 A 3/1969 Turner (Continued)

FOREIGN PATENT DOCUMENTS

DE 102004058531 6/2006
WO WO2009/073226 6/2009

OTHER PUBLICATIONS

International Searching Authority, U.S. Patent Office, International Search Report for International App. No. PCT/US2008/13463 dated Jan. 28, 2009.

*Primary Examiner* — Christopher Kim
(74) *Attorney, Agent, or Firm* — McDonald Hopkins LLC

(57) ABSTRACT

A long throw Pop-Up Irrigation Nozzle assembly has no oscillating or rotating parts and includes a cylindrical body having a fluid inlet and a sidewall defining at least one fluidic circuit configured to generate a selected spray pattern when irrigation fluid flows through the body. In order to throw long distance, droplet velocity, droplet size and droplet initial aim angle determine the throw to provide a low precipitation rate ("PR") for fluidic sprays. The nozzle assembly and method of the present invention achieve a PR of 1 in/hr or less and good spray distribution with a scheduling coefficient ("SC") of about 1.5 without utilizing any moving components to provide a significantly more cost effective nozzle assembly, as compared to prior art rotator nozzles.

11 Claims, 21 Drawing Sheets

Related U.S. Application Data

(60) Provisional application No. 61/136,744, filed on Sep. 30, 2008, provisional application No. 61/137,745, filed on Aug. 4, 2008, provisional application No. 61/012,200, filed on Dec. 7, 2007.

(51) Int. Cl.
    *B05B 1/30*    (2006.01)
    *B05B 15/10*    (2006.01)
    *A01G 25/00*    (2006.01)
    *B05B 1/14*    (2006.01)
    *B05B 15/06*    (2006.01)

(52) U.S. Cl.
    CPC ............. *B05B 15/10* (2013.01); *B05B 1/14* (2013.01); *B05B 15/065* (2013.01)

(58) Field of Classification Search
    USPC ........................................ 239/201–206, 589.1
    See application file for complete search history.

(56) References Cited

U.S. PATENT DOCUMENTS

| | | | |
|---|---|---|---|
| 3,563,462 A | 2/1971 | Bauer | |
| 3,829,018 A | 8/1974 | Oberto | |
| 3,934,820 A * | 1/1976 | Phaup | B05B 15/10 239/205 |
| 4,052,002 A | 10/1977 | Stouffer | |
| 4,151,955 A | 5/1979 | Stouffer | |
| 4,157,161 A | 6/1979 | Bauer | |
| 4,185,777 A | 1/1980 | Bauer | |
| 4,231,519 A | 11/1980 | Bauer | |
| 4,479,611 A | 10/1984 | Galvis | |
| 4,508,267 A | 4/1985 | Stouffer | |
| 4,867,378 A | 9/1989 | Kah | |
| RE33,158 E | 2/1990 | Bauer | |
| 5,035,361 A | 7/1991 | Stouffer | |
| 5,213,269 A | 5/1993 | Srinath | |
| 5,253,807 A | 10/1993 | Newbegin | |
| 5,779,148 A | 7/1998 | Saarem | |
| 5,971,301 A | 10/1999 | Stouffer | |
| 6,186,409 B1 | 2/2001 | Srinath | |
| 6,240,945 B1 | 6/2001 | Srinath | |
| 6,253,782 B1 | 7/2001 | Raghu | |
| 6,301,723 B1 * | 10/2001 | Goettl | E04H 4/169 239/204 |
| 6,502,764 B2 | 1/2003 | Walker | |
| 6,805,164 B2 | 10/2004 | Stouffer | |
| 6,837,448 B2 | 1/2005 | Han | |
| 6,942,164 B2 | 9/2005 | Walker | |
| 6,948,244 B1 | 9/2005 | Crockett | |
| 7,014,131 B2 | 3/2006 | Berning | |
| 7,111,793 B2 | 9/2006 | Maruyama | |
| 7,267,290 B2 | 9/2007 | Gopalan | |
| 9,776,195 B2 | 10/2017 | Russell | |
| 2004/0251315 A1 | 12/2004 | Maruyama | |
| 2005/0087633 A1 | 4/2005 | Gopalan | |
| 2006/0000932 A1 | 1/2006 | Gregory | |
| 2007/0295840 A1 | 12/2007 | Gopalan | |
| 2015/0102126 A1 | 4/2015 | Russell | |

* cited by examiner

Fluid distribution contour plot for an irrigation nozzle with heavy bands.
(Light region is >0.010 in of precipitation)

Fluid distribution contours for same circuit as in Fig. 1, only with
(Light region is >0.010 in of precipitation)

IRRIGATION NOZZLE ASSEMBLY AND METHOD

PRIORITY CLAIMS AND REFERENCE TO RELATED APPLICATIONS

This application is a Divisional application for copending U.S. non-provisional application No. 12/314,242. This application also claims priority to related and commonly owned U.S. patent application No. 12/314,242. This application also claims priority to related and commonly owned U.S. provisional patent application No. 61/012,200, filed Dec. 7, 2007, the entire disclosure of which is incorporated herein by reference. This application also claims priority to related and commonly owned U.S. provisional patent application Nos. 61/136,744 and 61/136,745, each filed Sep. 30, 2008, the entire disclosures of which are also incorporated herein by reference.

BACKGROUND OF THE INVENTION

Field of the Invention

The present invention relates to irrigation nozzles or sprinkler heads, as used in automatic lawn sprinkling and other irrigation systems.

Discussion of Related Art

In-ground irrigation nozzles (e.g., sprinkler heads) have been on the market for many years and come in many different configurations for depositing a selected amount of irrigation fluid (e.g., water) upon a designated landscape area through a spray. For a good performing spray, the amount of water sprayed is minimized to: (a) reduce runoff, yet (b) still adequately irrigate the entire area and (c) do so in a reasonable amount of time. The amount of water used is defined as "precipitation rate" (or "PR") commonly measured and expressed in "inches per hour" or "in/hr."

Uniform distribution is desirable and the uniformity in distribution of that water is commonly measured and expressed in terms of the Scheduling Coefficient ("SC"), which can be used as a multiplier to determine how much longer a spray must run in order to irrigate the driest patch to the same amount as the mean application rate for the entire area. Optimum precipitation rates depend on soil conditions, but in general it is desirable to have an irrigation nozzle assembly (or sprinkler) with a PR of 1 in/hr or less. SC values of 1.5 or less are considered good within the irrigation industry, with an absolute best being 1.0.

In order to achieve good spray performance, some nozzles on the market today utilize rotating parts, friction plates, and viscous brakes. U.S. Pat. No. 6,942,164, to Walker is a useful example of a rotating sprinkler or nozzle. While these rotator nozzles can achieve a PR around 0.5 in/hr and good distribution, they are relatively costly compared to fixed sprays. Current sprinkler heads with fixed sprays have no moving parts and are used in short to medium spray throw distances (up to 15 feet or so), but have PR's greater than 1 in/hr and varying spray distribution, including dual spray designs.

Current fixed sprays are "non-fluidic" and so rely on spreading an impinging jet into a fan spray (i.e., a liquid sheet). This shears the spray and so can make finer drops having lower velocity. As a result, these nozzles have high PR (about 1.4 and above), especially at longer throws (throw is also referred to as radius, in some applications). For a 360 deg spray (i.e., a full spray), non fluidic nozzles typically use a swirl spray that produces a conical sheet. Swirling sheets also produce fine drops and low velocity, resulting in a low throw (or short radius).

Fixed sprays are available in throws (or radii) ranging from 5' to 15' with a 25% throw adjustment for each nozzle. Achieving throws from 5' to 10' at low PR (PR≤1) is relatively easy even for non fluidic sprays. However as the throw increases (i.e. for 12' and 15'), velocity and droplet size become critical, and PR increases (PR>1.4) for non-fluidic sprays.

Applicants have discovered that fluidic spray nozzles may be designed for a wide range of PR values, and particularly PR≤1 all through the range of 5'-15', but these results required a significant amount of new development work, experimentation and testing.

Generally speaking, fluidic oscillators are known in the prior art for their ability to provide a wide range of liquid spray patterns by cyclically deflecting a liquid jet. Examples of fluidic oscillators may be found in many patents, including U.S. Pat. No. 3,185,166 (Horton & Bowles), U.S. Pat. No. 3,563,462 (Bauer), U.S. Pat. No. 4,052,002 (Stouffer & Bray), U.S. Pat. No. 4,151,955 (Stouffer), U.S. Pat. No. 4,157,161 (Bauer), U.S. Pat. No. 4,231,519 (Stouffer), which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer), U.S. Pat. No. 6,186,409 (Srinath) and U.S. Pat. No. 6,253,782 (Raghu), which are summarized below.

The operation of most fluidic oscillators is usually characterized by the cyclic deflection of a fluid jet without the use of mechanical moving parts. Consequently, an advantage of fluidic oscillators is that they are not subject to the wear and tear which adversely affects the reliability and operation of pneumatic oscillators and reciprocating nozzles. The fluidic oscillators described in U.S. Pat. No. 3,185,166 (Horton & Bowles) are characterized by the use of boundary layer attachment (i.e., the "Coanda effect," so named for Henri Coanda, the first to explain the tendency for a jet issuing from an orifice to deflect from its normal path (so as to attach to a nearby sidewall) and the use of downstream feedback passages which serve to cause the jet issuing from a power nozzle to oscillate between right and left side exit ports.

At the risk of boring those having skill in this rather specialized art, a rather substantive background is provided here. It is understood that the three-dimensional character of the flow from such fluidics can take a variety of forms depending upon the three-dimensional shape of the fluidic. For example, oscillators described in U.S. Pat. No. 4,052,002 (Stouffer & Bray) are characterized by the selection of the dimensions of the fluidic such that no ambient fluid or primary jet fluid is ingested back into the fluidic's interaction region, which yields a relatively uniform spray pattern made up of droplets of more uniform size. The absence of inflow or ingestion from outlet region is achieved by creating a static pressure at the upstream end of interaction region which is higher than the static pressure in outlet region. This pressure difference is created by a combination of factors, including: (a) the width T of the exhaust throat is only slightly wider than power nozzle so that the egressing power jet fully seals the interaction region from outlet region; and (b) the length D of the interaction region from the power nozzle to throat, which length is significantly shorter than in prior 'fluid ingesting' oscillators. It should be noted that the width X of control passages is smaller than the power nozzle. If the width of power nozzle at its narrowest point is W, then the following relationships were found to be suitable, although not necessarily exclusive, for operation in the manner described: T=1.1-2.5 W and D=4-9 W, with the ratios of these dimensions also being found to control the fan angle over which the fluid is sprayed. By adding a divider in this fluidic's outlet region, it becomes what can be referred to as two-outlet oscillator of the type that might be used in a windshield washer system. See, for example, U.S. Pat. No. 4,157,161 to Bauer.

The fluidic oscillators described in U.S. Pat. No. 4,231,519 (Stouffer, reissued as U.S. Pat. No. RE 33,158), are also unique in that they employ yet another fluid flow phenomena to yield an oscillating fluid output. The oscillators of U.S. Pat. No. 4,231,519 are characterized by their utilization of the phenomena of vortex generation, within an expansion chamber prior to the fluidic's throat, as a means for dispersing fluid. It comprises a jet inlet that empties into an expansion chamber which has an outlet throat at its downstream end. It also has an interconnection passage that allows fluid to flow from one side to the other of the areas surrounding the jet's inlet into its expansion chamber. The general nature of the flow in such fluidics is that vortices are seen to be formed near the throat. As the vortices grow in size they cause the centerline of the fluid flowing through the expansion chamber to be deflected to one side or the other such that the fan angle of the jet issuing from the throat ranges from approximately +45 degrees to −45 degrees. The result of these flow oscillations is a complicated spray pattern, which at a given instant takes a sinusoidal form (similar to that shown in FIG. 6(e) in commonly owned U.S. Pat. No. 6,805,164).

The fluidic oscillators disclosed in U.S. Pat. No. 5,213,269 (Srinath) and U.S. Pat. No. 5,971,301 (Stouffer) are referred to as "box oscillators" having interconnects which serve to help control the oscillating dynamics of the flow that exits from the fluidic's throat. For example, the effect of these interconnects, assuming that they are appropriately dimensioned relative to the other geometry of the fluidic, is generally seen to be about a doubling of the fan angle of the fluid exiting from the fluidic's throat. FIG. 8(a) from U.S. Pat. No. 5,213,269 shows an embodiment in which the interconnect takes the form of passage that connects points on opposite side of the fluid's throat. FIG. 8(b) from U.S. Pat. No. 5,971,301 shows an embodiment in which the interconnect takes the form of a slot in the bottom wall of the fluidic's interaction region.

U.S. Pat. No. 6,253,782 (Raghu) discloses a fluidic oscillator of the type that provides a shaped interaction region having two entering power nozzles and a single throat through which the resulting fluid flow exits the fluidic oscillator. See FIGS. 9(a)-(b). The jets from the power nozzles are situated so that they interact to form various vortices which continually change their positions and strengths so as to produce a sweeping action of the fluid jet that exits the throat of the fluidic. In a preferred embodiment, the interaction region has a mushroom or dome-shaped outer wall in which are situated the power nozzles. U.S. Pat. No. 6,186,409 (Srinath) discloses a fluidic oscillator which has two power jets entering a fluid interaction region from the opposite sides of its longitudinal centerline. The jets are fed from the same fluid source, and are unique because they employ a filter between the jet source and the upstream power nozzles to remove any possible contaminants in the fluid.

In order to function properly, fluidic oscillators need to have proper sealing so as to not cause leaking across flow channels. The typical construction for the fluidic oscillator has been to fabricate the fluidic circuit in one surface and sealed with another surface. FIG. 1 depicts a crossover-type fluidic element 10 formed in a body member 11. Recesses 13 are typically formed in surface 12 by injection-molding, and a cover plate 16 is placed against a surface to seal the fluidic element. In U.S. Pat. No. 4,185,777, the fluidic circuit element 20 is injection-molded in a chip member 21 (or "chip") which is then sealed by abutting the surface against another member, and in order to prevent leakage, the molded element is force-fitted into a housing 22. (See FIG. 2 in the '244 patent.) In U.S. Pat. No. 6,948,244, a method for molding fluidic circuit "chips" is described. This detailed background is provided, in part, to illustrate the concepts and nomenclature of fluidic circuits, an area of particular expertise for this applicant, and the above identified references are incorporated by reference.

Irrigation nozzles such as lawn sprinklers, generally, and fluidic oscillators, generally, are distinct technologies and each are known to persons in their respective areas of the different arts, but there has not yet been a satisfactory way to combine them into a reliable and cost effective structure or method for generating adequately high velocity and large droplet size in a manner that would be advantageous for irrigation applications, where a long throw is desired with low flow rate, so that the "precipitation rate" can be reduced.

Fluidic sprays rely on a jet that oscillates to produce a fan spray. Thus, the output is not a liquid sheet but a stream that has high velocity with good droplet size. This knowledge has been applied to the long felt need to provide a reliable, inexpensive and uniform system and method for irrigating a selected region.

Other considerations have also been addressed. Sprinkler systems used for irrigating lawns and parks must be serviced periodically, to prevent damage from expansion of freezing water in the pipes and sprinkler heads. Annually, the systems are cleared of water, often with compressed air, to drive all water out of the pipes and sprinkler components. The following spring, water is re-introduced into the system and that water must first displace the air in the pipes.

Recent advances in fluidics technology have been evaluated for use in irrigation systems, partly because fluidic oscillators can be adapted to provide a very uniform pattern of fluid dispersion over an area selected for irrigation. These new fluidic circuits provide significantly different hydraulic impedance to the flow of water, when compared to an open spray nozzle, however, and so the introduction of water into a system having trapped air in the lines presents a new challenge.

Specifically, the applicants have discovered a problem with a fluidic equipped prototype sprinkler or nozzle assembly. The issue was that under some conditions, mainly after winterization of a residential or commercial irrigation system, there is an air void in the plumbing leading up to the fluidic equipped nozzle. When the water is turned back on to the system a wave of water travels at a high rate of speed down the plumbing, displacing the air. This instantaneous impact created by the density difference between the remaining air void and wave of water generates excessive loads that can damage a fluidic nozzle insert or force it out of the housing. The impact force produced by the "surge" turns out to be quite high, close to 30 lbf.

There is a need, therefore, for a convenient, reliable and inexpensive assembly structure and method for protecting a fluidic equipped irrigation nozzle from the water-hammer like effect of this first inrush of water.

SUMMARY OF THE INVENTION

The nozzle assemblies and method of present invention overcome the above mentioned difficulties by providing a reliable and inexpensive system and method for irrigating a selected area. By combining selected lawn sprinkler technologies with newly configured fluidic oscillators, the problems discussed above are overcome. A reliable and cost effective structure and method are shown to generate adequately large, high velocity droplets for irrigation applications, where a long throw is desired with low flow rate, so that the "precipitation rate" can be reduced.

In accordance with the present invention, a sprinkler head or irrigation nozzle achieves long throw distance using a "fixed" assembly with no oscillating or rotating parts. In order to throw long distance, velocity and droplet size are very important in addition to the initial aim angle. The applicants have discovered that velocity plays a stronger role than droplet size to determine the throw. These discoveries enable the development of a nozzle that can provide low PR for fluidic sprays.

The present invention effectively utilizes fluidic technology to achieve good spray performance, obtaining a PR of 1 in/hr or less and good spray distribution with a SC of about 1.5 without utilizing any moving components and which is significantly more cost effective than rotator nozzles.

The fluidic irrigation nozzle (or sprinkler head) assembly of the present invention includes a cylindrical housing having an exterior sidewall with one or more slots in which spray generating fluidic inserts or plugs are inserted. Depending on the spray configuration desired, the appropriate number of inserts (or fluidic circuit chips) are assembled, with the remaining slots filled with blanks. The inserts seal against the housing so that irrigation fluid (e.g., water) is emitted or exits only through insert throat openings.

In an alternative embodiment, the fluidic oscillators are permanently bonded within the slots, or are integral with the housing's exterior surface.

The top of the housing preferably has markings to indicate the nominal throw radius and the spray arc for the appropriate spray configuration. A radius adjustment screw is threaded through the housing and accessed by the installer or user from above with a simple flat-bladed screwdriver. The radius adjustment screw is used to change the amount of irrigation fluid flow that enters the insert(s) and therefore affects the throw radius of the emitted spray.

The exemplary nozzle assemblies of the present invention are described in greater detail below, but each is configured with a housing that will work in standard sprinkler systems, in place of standard fixed or pop-up sprinkler heads. In the illustrated embodiments, the housing has a substantially cylindrical exterior sidewall with an outside diameter of 19.18 mm, an axial length of 11.18 mm, terminates distally in an transverse flange having an outside diameter of 22.86 mm and carries, on its proximal end, a narrower threaded proximal tubular segment with an outside diameter of 15.01 mm. While the illustrated embodiments are "male" meaning that the proximal segment carries external threads (e.g., ⅝-28), the nozzle assemblies are also readily configured as "female" meaning that the connecting threads are carried within the proximal tubular segment's interior sidewall, near the proximal end.

Obtaining the improved performance of the present nozzle assembly is not a matter of simply grafting a fluidic circuit into the sidewall of a sprinkler nozzle, however, because new problems were encountered. Sprinkler systems used for irrigating lawns and parks must be serviced periodically, to prevent damage from expansion of freezing water in the pipes and sprinkler heads. Annually, sprinkler systems are cleared of water, often with compressed air, to drive all water out of the pipes and sprinkler components. The following spring, water is re-introduced into the system and that water must initially displace the air in the pipes.

The prototype fluidic oscillators which have been be adapted to provide a very uniform pattern of fluid dispersion over an area selected for irrigation provide significantly different hydraulic impedance to the flow of water, when compared to an open spray nozzle. And so the introduction of water into a system having trapped air in the lines presented a new challenge. Specifically, the applicants have discovered a problem with a fluidic equipped sprinkler or nozzle assembly. In a new installation or after winterization of a residential or commercial irrigation system, the air void in the plumbing leading up to the fluidic equipped nozzle gives way to inrushing water, which has considerable mass, When the water is turned on, a wave of water travels at a high rate of speed down the plumbing, displacing the air, which hisses out through the relatively tiny fluidic circuit orifices, until the inrushing water crashes into the fluidic circuit's inlets. An instantaneous impact is created by the density difference between the remaining air being voided and wave of water and that impact generates excessive loads that can damage a fluidic nozzle insert or force it out of the housing. The impact force produced by the "surge" turns out to be quite high, close to thirty pounds-force ("30 lbf").

The structure and method of an illustrative embodiment of the present invention protects a fluidic equipped irrigation nozzle from the water-hammer like effect of this first inrush of water. In one embodiment, a ring-shaped Pressure Compensating Device ("PCD") holder is dimensioned to be press-fit onto the bottom of the housing. The PCD holder or ring acts as a restrictor and shutoff for the radius adjustment screw. The PCD holder also seals against a filter basket, which provides a sieve or screen and prevents debris larger than a certain size from entering the insert(s) and clogging them, and can serve to hold a PCD gasket, an optional item that can be used to help stabilize flow under varying supply pressure.

In an alternative embodiment, a filter basket snaps into the housing and provides a valve seat surface for the radius adjustment screw's proximal end. The spray performance is relatively stable under various pressures, due to the fluidic oscillator(s).

A basic fluidic irrigation nozzle or sprinkler head in accordance with the present invention can have a variety of spray patterns. Fixed sprays are available as Q (90 deg), H (180 deg), TQ (270 deg), F (360 deg), T (120 deg), TT (240 deg), as well as 60 deg, 150 deg and 210 deg sprays and as specialty sprays. In the elementary form, a selected fluidic insert such as a Three Jet Island or a Mushroom has been used to produce a 90 deg fan. This could be a single spray or a double spray, having a fluidic geometry on both sides of an insert. In the elementary form, the fluidic irrigation nozzle is quite satisfactory, however there were some issues with radius control and low PR. In order to optimize the spray (i.e. achieve PR<1 and SC~1.5), a preferred fluidic embodiment utilizes a split throat mushroom on one side and a single mushroom circuit on the other. This combination yields PR<=1, SC<=1.5 and, when combined with the filter interface and radius adjustment screw, robust radius control.

One embodiment for the fluidic has been adapted for enhanced uniformity over a selected spray area, and includes "bumps" which are dimensioned and positioned to optimize the oscillating pattern for use in some applications. The "bump" embodiment fluidic circuit and method can redistribute bands of heavy flow, resulting in a more uniform flow distribution while using no power or moving parts. In the exemplary embodiment, a bump or upwardly projecting protrusion is added to the floor of the circuit downstream of the throat, near the heavy portion of the spray. The exemplary protrusion is cylindrical in shape, but other shapes may be used. The protrusion does not take up the entire the height of the circuit. The fluidic circuit sweeps a stream of fluid back and forth across the opening. As the heavy stream passes over the protrusion, the flow is diverted over and around the protrusion, and broken into smaller drops. When the stream continues on to the other extreme of its travel, it is not affected by the protrusion. In a case where it is desirable to smooth the heavy center of a fluidic's spray without affecting the crisp edges of the spray, the protrusions are located closer to the splitter than to the outer edge of the spray. There are options for breaking up the heavy ends of a fluidic's spray. One large bump or protrusion can be used, centered within the sweep of the oscillating stream, or two substantially symmetrically arrayed equal-size protrusions may be used, closer to the edges of the spray. For a wider fan, using two protrusions will be more effective in redistributing the heavy ends. However, two separate bumps may not fit under a narrower fan, in which case, a single protrusion may be used. As noted before, the protrusions need not be circular in cross-section; a racetrack-shaped protrusion is another option.

The effect of these protrusions makes the spray from a circuit more uniform, because heavy spikes in the spray pattern are suppressed and the spray's uniformity over a selected azimuth or angular spray region is improved. Larger protrusions will have more of an effect on the spray. Applicants have been successful with protrusions 5-15% the height of the circuit, and more recently, with protrusions 5-40% the height of the circuit. The diameter of the protrusions (e.g., 0.3 mm) can vary from a fraction of the throat width to the same order of magnitude as the throat width.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE FIGURES

FIG. 1A is an exploded perspective view of a fluidic pop-up irrigation nozzle or sprinkler head illustrating the placement of the fluidic nozzle spraying inserts and fluid flow blocking plugs, in accordance with the present invention.

FIG. 1B is an exploded perspective view of the fluidic pop-up irrigation nozzle of FIG. 1B, illustrating the placement and orientation of an indicator ring, in accordance with the present invention.

FIG. 1C is a perspective view, in elevation, of the fluidic pop-up irrigation nozzle assembly of FIG. 1A, illustrating the placement of the fluidic nozzle spraying inserts and fluid flow blocking plugs, in accordance with the present invention FIG. 2 is an exploded perspective view of another fluidic pop-up irrigation nozzle assembly or sprinkler head adapted to receive from one to four fluidics (chips or fluidic inserts) and from one to three blanks in a housing with four radially arrayed slots, a flow adjustment screw, and a retention ring that bears against a filter with shutoff surface.

FIG. 3 illustrates, in perspective, fluidic circuit A, a split mushroom oscillator, the preferred embodiment (for longest throw in the smallest package with good distribution) includes a pair of the illustrated mushroom oscillators, with a top oscillator on one side of the fluidic chip or insert (see FIG. 4) and a bottom oscillator on the opposing side of the fluidic chip (as best seen in FIG. 5).

FIG. 4 illustrates a top view schematic diagram of fluidic circuit A showing the top split mushroom oscillator of FIG. 3, and the fan angles for the light center and heavy ended bands of spray are shown as part of the overall fan angle of spray, in accordance with the present invention.

FIG. 5 illustrates a bottom view schematic diagram of fluidic circuit A showing the bottom mushroom oscillator of FIG. 3, and the fan angles for the light center and heavy ended bands of spray are shown as part of the overall fan angle of spray, in accordance with the present invention.

FIG. 6 illustrates, in cross section, a nozzle assembly including fluidic circuit A (of FIGS. 2-5), and illustrates the aim angles and spray trajectories for the top and bottom sprays emitted from the top split mushroom oscillator and the bottom mushroom oscillator, respectively, in accordance with the present invention.

FIG. 7 illustrates a top view, in partial cross section, of a nozzle assembly having first and second fluidic inserts in adjacent slots, to provide an irrigation spray over a 180 degree (or half) spray, in accordance with the present invention.

FIG. 8 is a cross section view, in elevation, illustrating flow and radius control components; each fluidic circuit occupies a comparatively small space, and they are sensitive to irrigation fluid feed conditioning. In accordance with one aspect of the present invention, the 'PCD' is an optional pressure control device that may be installed in the PCD holder upstream of the shutoff.

FIG. 9 illustrates, in perspective, fluidic circuit B, with a three jet island oscillator, the illustrated embodiment (for longest throw in the smallest package with good distribution) includes a pair of oscillators, with a top three jet island oscillator on one side of the fluidic chip or insert (see FIG. 10) and a bottom oscillator on the opposing side of the fluidic chip (as best seen in FIG. 11).

FIG. 10 illustrates a top view schematic diagram of fluidic circuit B showing the top three jet island oscillator of FIG. 9, and the fan angle for the band of spray, in accordance with the present invention.

FIG. 11 illustrates a bottom view schematic diagram of fluidic circuit B of FIG. 9, showing the bottom mushroom oscillator, and the fan angles for the light center and heavy ended bands of spray are shown as part of the overall fan angle of spray, in accordance with the present invention.

FIG. 12 is a top view, in partial cross section, for a nozzle assembly including a fluidic circuit B, a 3-jet island oscillator with mushroom oscillator; applicants observed that this combination can give better distribution than circuit A, but noted that the three jet island oscillator does not maintain fan angle well when the flow and radius control is introduced.

FIG. 13 illustrates, in perspective, fluidic circuit C, a feedback oscillator, this embodiment (for longest throw in the smallest package with good distribution) includes a pair of the illustrated feedback oscillators, with a top oscillator on one side of the fluidic chip or insert (see FIG. 14) and a bottom oscillator on the opposing side of the fluidic chip (as best seen in FIG. 15).

FIG. 14 illustrates a top view schematic diagram of fluidic circuit C showing the top feedback oscillator of FIG. 13, and the fan angles for the spray are shown, in accordance with the present invention.

FIG. 15 illustrates a bottom view schematic diagram of fluidic circuit C showing the bottom feedback oscillator of FIG. 13, and the fan angles for the spray are shown as part of the overall fan angle of spray, in accordance with the present invention.

DESCRIPTION OF THE PREFERRED EMBODIMENT

Turning now to FIGS. 1A-18, in accordance with the present invention, a long throw distance pop-up sprinkler head or irrigation nozzle assembly 150 achieves long throw distance using "fixed" components with no oscillating or rotating parts. While the illustrated embodiment is a "pop-up" sprinkler head, adapted to function is an industry-standard form factor, other configurations are readily adapted from these examples. For example, the nozzle assembly 150 is ready altered to be "fixed", and so need not include the "pop-up" features. As noted above, the nozzle assemblies described below are each configured with a housing that will work in standard sprinkler systems, in place of standard fixed or pop-up sprinkler heads. In the illustrated embodiments (e.g., FIGS. 1A-20), the housing (e.g., 103) has a substantially cylindrical exterior sidewall with an outside diameter of 19.18 mm, an axial length of 11.18 mm, terminates distally in an transverse flange having an outside diameter of 22.86 mm and carries, on its proximal end, a narrower threaded proximal tubular segment with an outside diameter of 15.01 mm. While the illustrated embodiments are "male" meaning that the proximal segment carries external threads (e.g., 5/8-28), the nozzle assemblies are also readily configured as "female" meaning that the connecting threads are carried within the proximal tubular segment's interior sidewall, near the proximal end (see FIGS. 6 and 20).

Figure 1A:
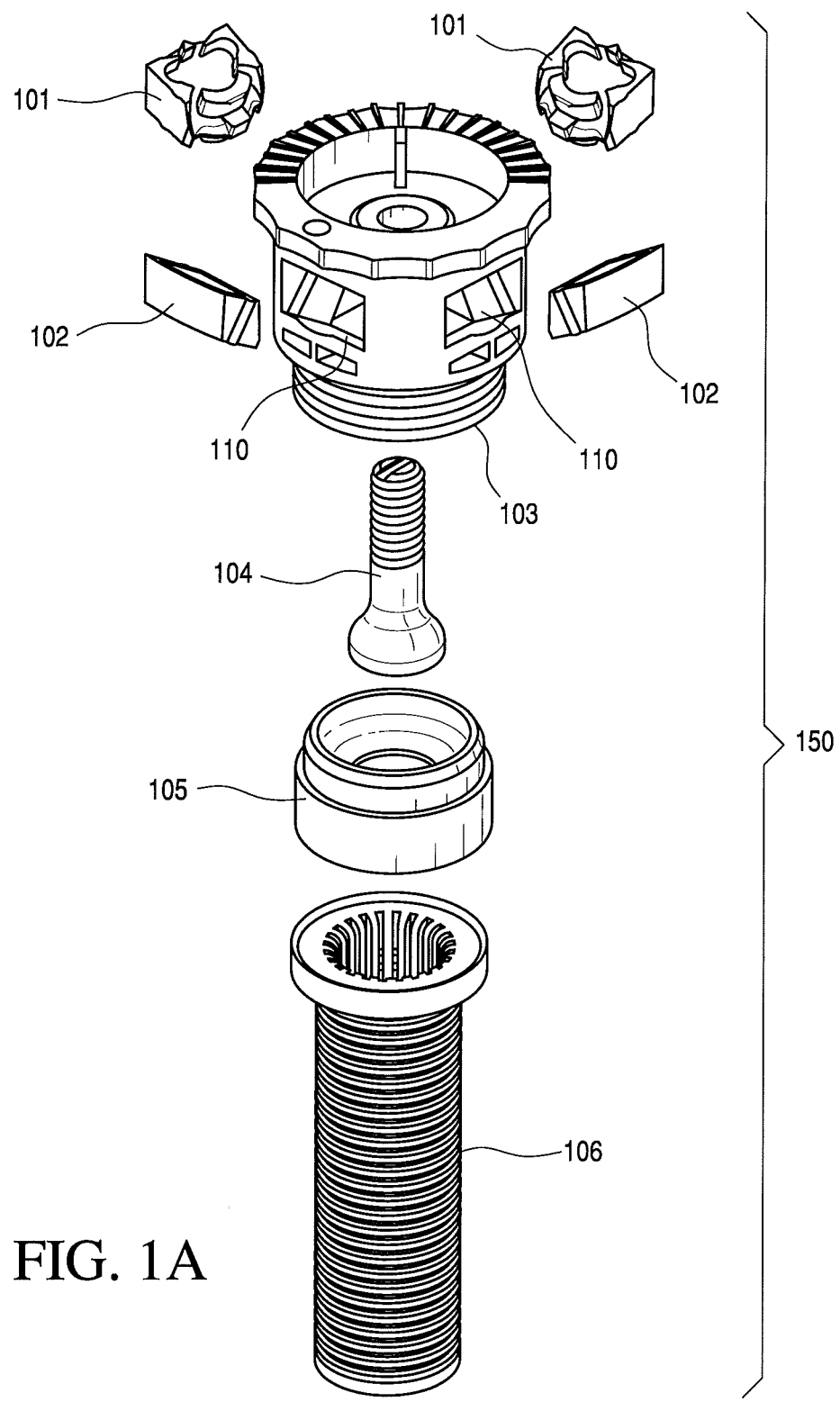
Figure 1B:
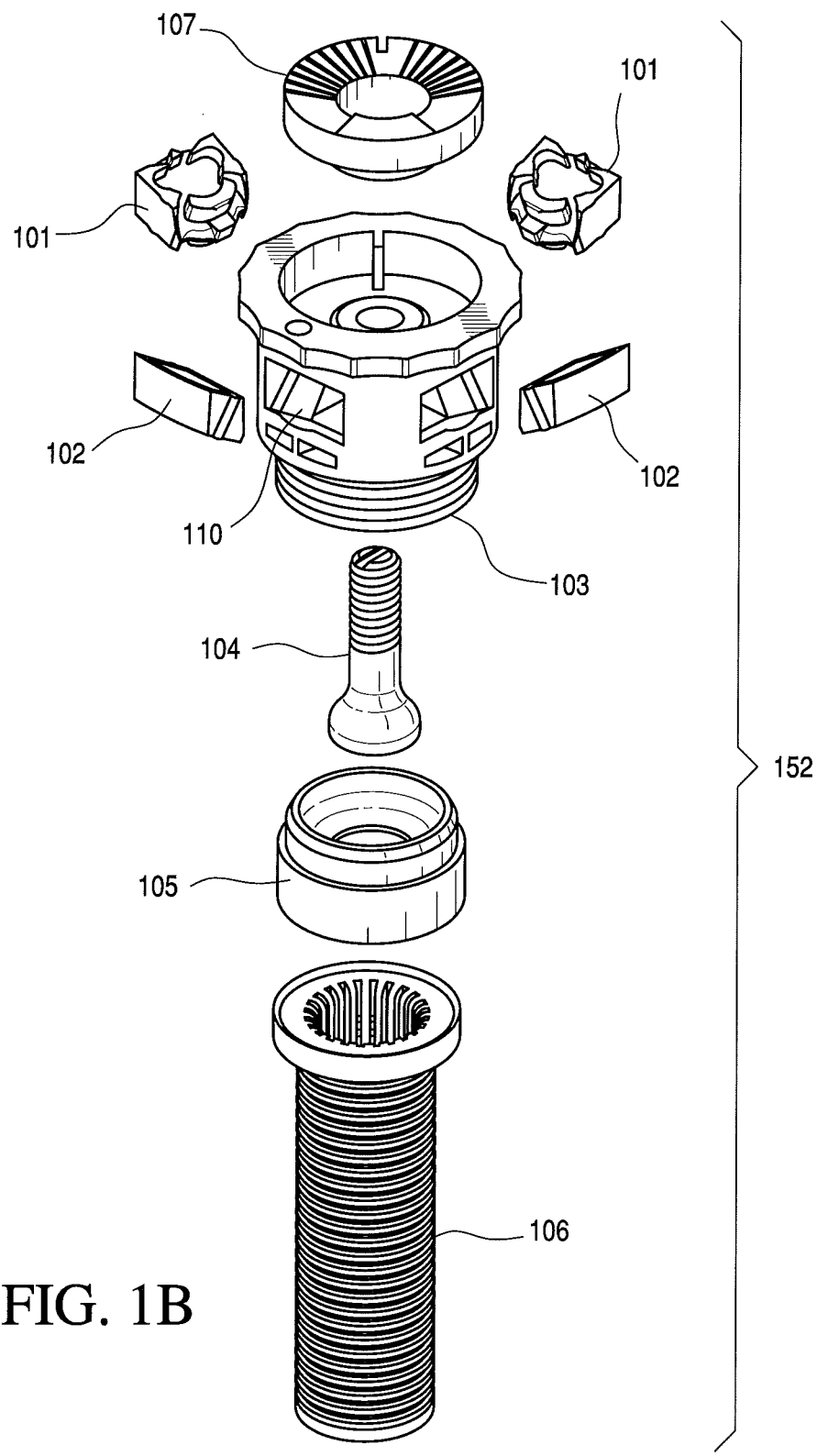
Figure 1C:
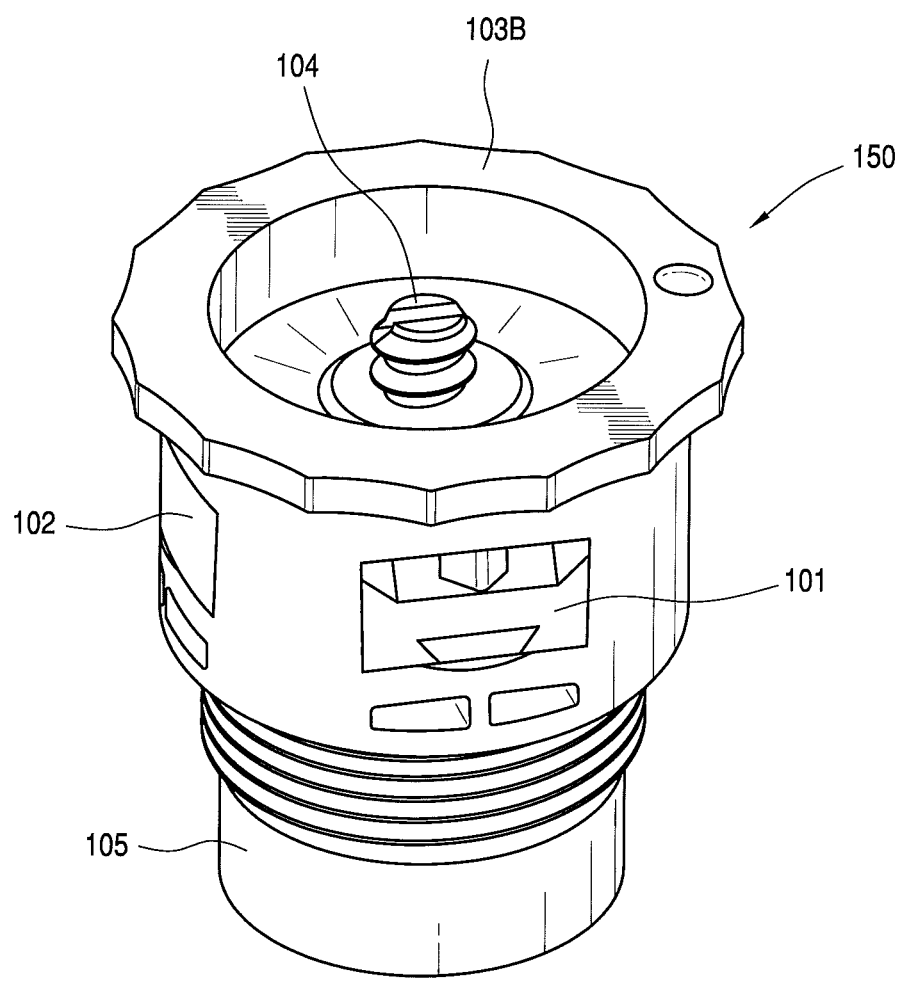

Nozzle assembly 150, illustrated in FIGS. 1A and 1C comprises a substantially cylindrical housing 103 with a hollow interior. Housing 103 defines a substantially tubular fluid-impermeable structure that is symmetrical around a vertical axis, with a top or distal flange and a segment of exterior threads extending from the proximal or bottom end of the exterior sidewall. As can be seen in the cross sectional view of FIG. 6, the housing sidewall includes an array of four upwardly angled ports or slots 110, each defining a substantially rectangular passage or aperture with smooth interior slot wall surfaces. The interior sidewall surfaces are preferably dimensioned for cost effective fabrication using molding methods and preferably include sidewall grooves positioned and dimensioned to form a "snap fit" with ridges or tabs in mating inserts (e.g., 101) or blanks (e.g., 102).

Nozzle assembly 150 can be configured to include one, two, three or four fluidic circuit inserts or chips 101 which are dimensioned to be tightly received in and held by the radially arrayed slots 110 defined within the sidewall of housing 103. The ports or slots 110 provide a channel for fluid communication between the housing's interior lumen and the exterior of the housing. Blanks or plugs 102 are also dimensioned to fit tightly within housing slots 110, and those slots fitted with a plug 102 are sealed and thus prevent any fluid passing between the housing's interior and the housing's exterior in the radial direction of the sealed slot. Housing 103 has a distal or top closed end with an annular distal flange and a dished or recessed circular end wall having a vertical and axially aligned, threaded bore that threadably receives an axially aligned adjustment screw 104. The distal end or top of adjustment screw 104 preferably includes a transverse slot sized to receive a slotted screw driver. Adjustment screw 104 has an elongate shaft with threads extending from the distal end to a central portion of the shaft and the proximal end or bottom of adjustment screw 104 includes a frustoconical head which defines a flow-restricting valve plug end.

Nozzle assembly 150 also includes a cylindrical collar or Pressure Compensating Device ("PCD") holder which also defines a hollow interior lumen with an inwardly projecting annular flange that is contoured to provide a sealing surface which can act in cooperation with the flow restricting valve plug end at the proximal end of adjustment screw 104 to adjust the flow entering the lumen within housing 103. As can be seen by reference to the cross sectional view of FIG. 6, adjustment screw 104 can be threadably advanced in the proximal direction until flow restricting valve plug end at the proximal end of adjustment screw 104 is pressed against the sealing surface or valve seat defined by the inwardly projecting annular flange carried within PCD holder 106. In this way, flow from nozzle assembly 150 can be adjusted to compensate for variations in pressure among the nozzle assemblies used in an irrigation system.

In order to throw droplets of irrigation fluid over a long distance, velocity and droplet size are very important, as is the initial aim angle. Applicants have discovered that velocity plays a stronger role than droplet size to determine the throw. This discovery enables a low PR through the proper configuration and use of fluidic sprays. Irrigation nozzle assembly 150 effectively utilizes fluidic technology to achieve good spray performance, obtaining a PR of 1 in/hr or less and good spray distribution with a SC of about 1.5 without utilizing any moving components. As a result lawn sprinkler using nozzle 150 is significantly more cost effective than prior art rotator nozzles.

Alternatively, using 10% greater flow yields a PR of 1.1 inch per hour with an SC in the range of 1 to 2, for various examples of the nozzle assembly.

The nozzle assembly is capable of providing a relatively constant precipitation rate (or Matched Precipitation Rate "MPR") over a range of throw, radius (e.g., 5, 10 or 15 feet) or arc (e.g., 90, 120, 180 or 360 degree) conditions.

Referring again to FIGS. 1A, 1C and FIG. 5, fluidic irrigation nozzle assembly 150 preferably includes a cylindrical housing 103 having an exterior sidewall with one or more slots in which spray generating fluidic inserts 101 or sealing plugs 102 are inserted. Depending on the spray configuration desired, the appropriate number of inserts 101 are assembled, with the remaining slots filled with plugs 102. The inserts 101 and plugs 102 seal against the housing so that irrigation fluid (e.g., water) is emitted or exits only through fluidic insert throat openings. The top of housing 103 preferably has flange upper surface markings to indicate the nominal throw radius and the spray arc for the appropriate spray configuration. Spray radius adjustment screw 104 is threaded through the housing's axial bore and accessed by the installer or user from above with a simple flat-bladed screwdriver. The radius adjustment screw 104 is used to change the amount of irrigation fluid flow that enters the fluidic insert(s) and therefore affects the spray or throw radius of the emitted spray. A PCD (Pressure Compensating Device) holder 105 is press-fit onto the bottom of the housing 103 and acts as a restrictor and shutoff for the radius adjustment screw (see FIG. 8). The PCD holder 105 also seals against a filter basket 106, which provides a sieve or screen and prevents debris larger than a certain size from entering the fluidic insert(s) and clogging them, and can serve to hold a PCD gasket, an optional item (not shown) that can be used to help stabilize flow under varying supply pressure.

Figure 5:
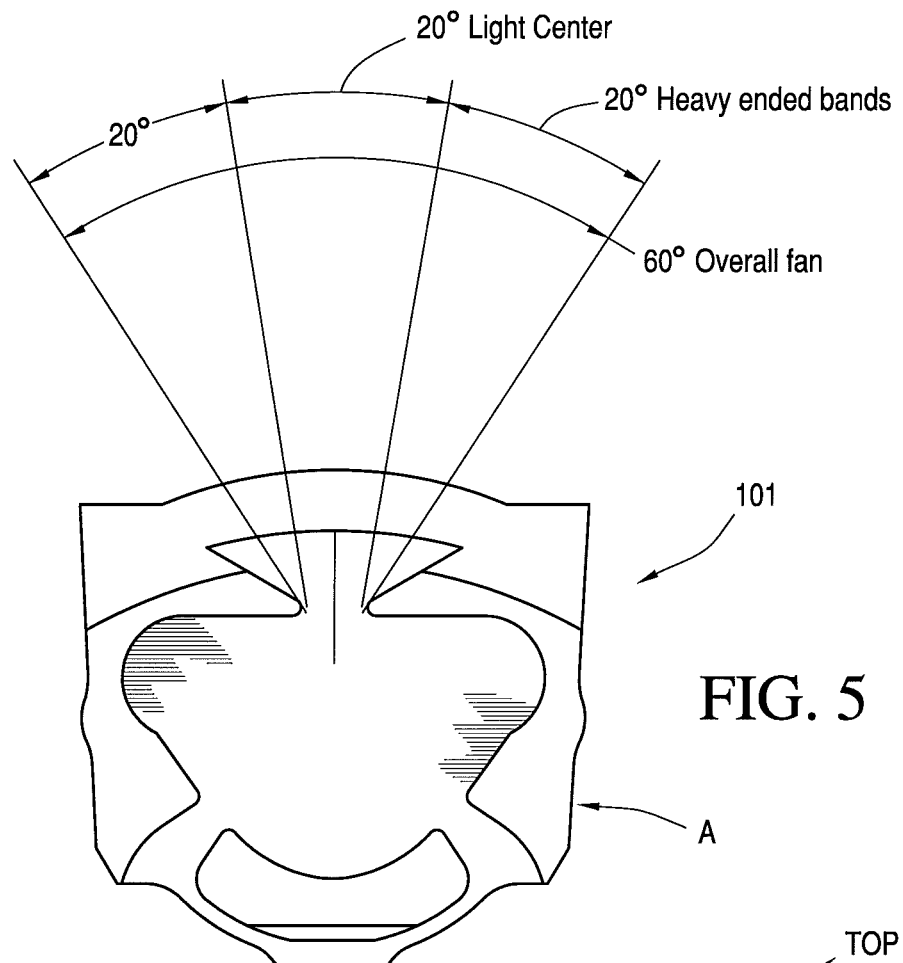
Figure 6:
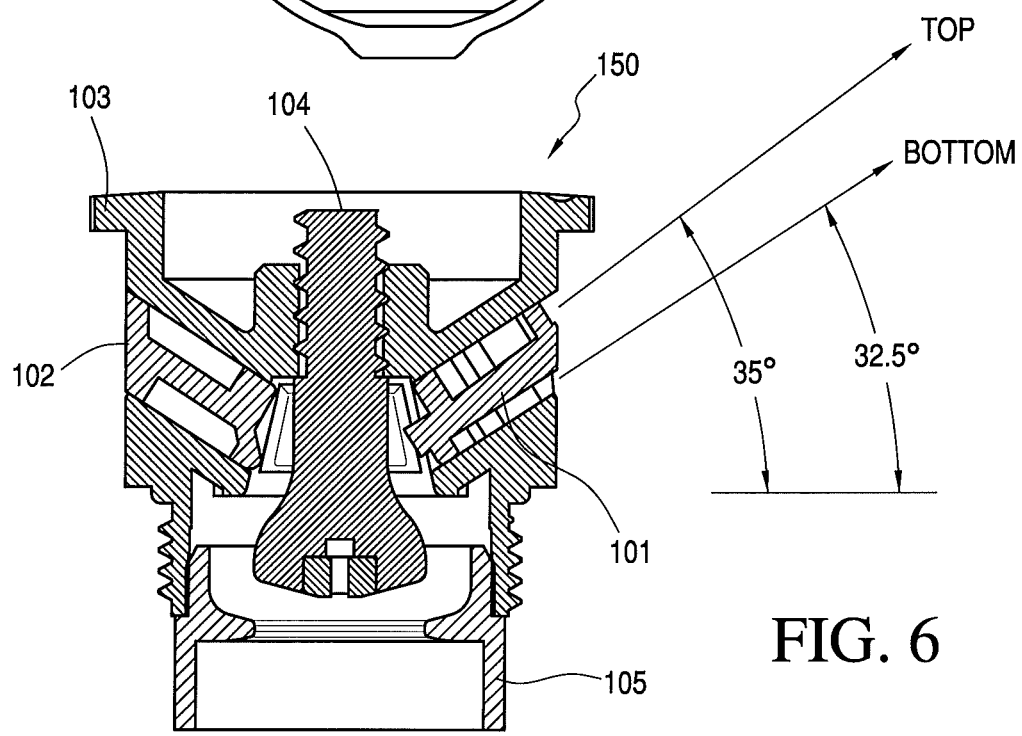
Figure 7:
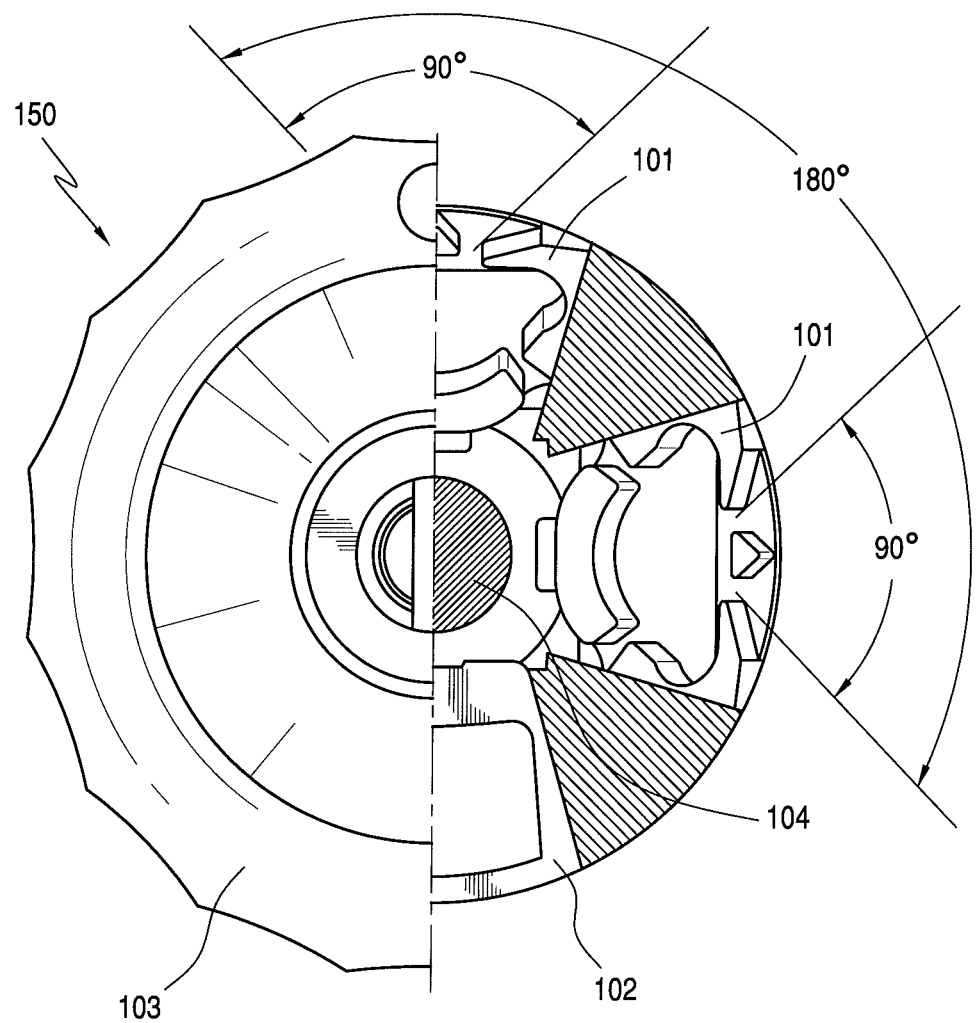
Figure 10:
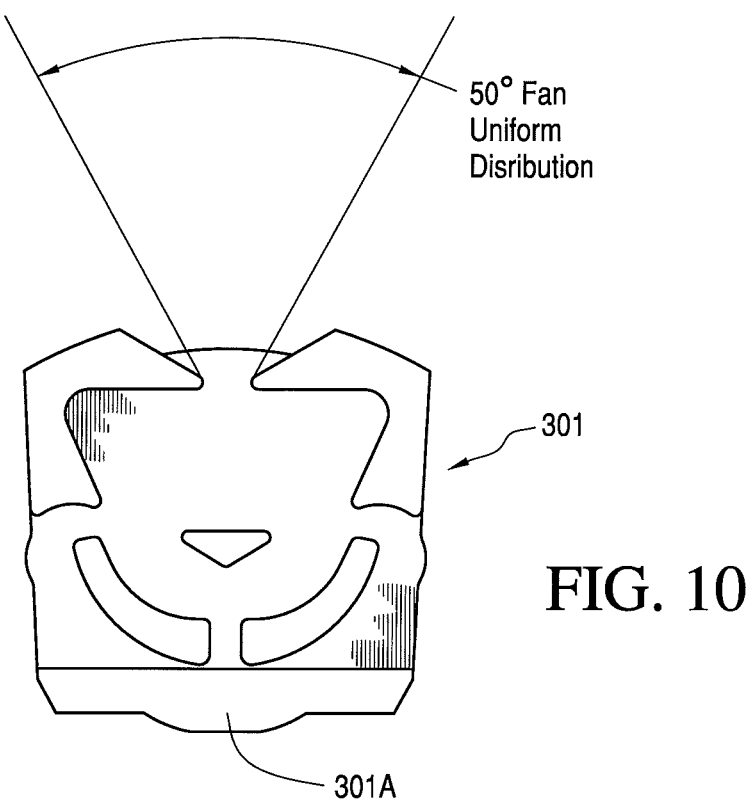

A basic fluidic irrigation nozzle in accordance with the present invention can have a variety of spray patterns. Fixed sprays are available as Q (meaning "quarter" for 90 deg), H (meaning "half" for 180 deg), TQ (meaning "three-quarter" for 270 deg), F (meaning "full" for 360 deg), T (meaning "third" for 120 deg), TT (meaning "two-thirds" for 240 deg) and as specialty sprays. In the elementary form, a selected fluidic insert such as a Three Jet Island (e.g., as shown in FIG. 10) or a Mushroom (e.g., as shown in FIG. 5) has been used to produce a 90 deg fan. This could be a single spray or a double spray (e.g., as shown in FIGS. 6 and 7), having a fluidic geometry on both sides of an insert.

The internal structures of the fluidic oscillators are further described in this applicant's other patents and pending applications. For example, the "Mushroom" oscillator as shown in FIG. 5 includes an oscillation inducing chamber described in U.S. Pat. No. 6,253,782 (and an improved mushroom is described in U.S. Pat. No. 7,267,290); the "Double Spray" configuration is described in U.S. Pat. No. 7,014,131; the "Three Jet" island oscillator has power nozzles feeding an interaction region and is described in U.S. Patent Application Publication 2005/0087633; and the "Split Throat" oscillator includes internal nozzles feeding an interaction chamber and is described in U.S. Patent Application Publication 2007/0295840. The entire disclosure of each the foregoing patents and published applications are incorporated herein by reference.

In the elementary form, the fluidic irrigation nozzle is quite satisfactory; however there were some issues with adjusting radius control while maintaining low PR. In order to optimize the spray (i.e. achieve PR<1 and SC~1.5), a fluidic circuit embodiment 'A' using a split throat mushroom on one side and a single mushroom circuit on the other was developed. This combination yields PR<1, SC of 1.5 and robust radius control. Nozzle assembly and fluidic circuit embodiments with this combination of fluidics are illustrated in FIGS. 1A-8. FIG. 1A is an exploded perspective view of fluidic pop-up irrigation nozzle 150 illustrating the placement of user or installer selectable fluidic nozzle spraying inserts 101 and fluid flow blocking plugs 102. FIG. 1B is an exploded perspective view of a fluidic pop-up irrigation nozzle 152 which differs from nozzle assembly 150 by inclusion of an indicator ring 107. FIG. 1C is a perspective view, in elevation, of fluidic pop-up irrigation nozzle assembly 150, illustrating the placement of the user or installer selectable fluidic nozzle spraying insert 101 and fluid flow blocking plug 102.

Figure 2:
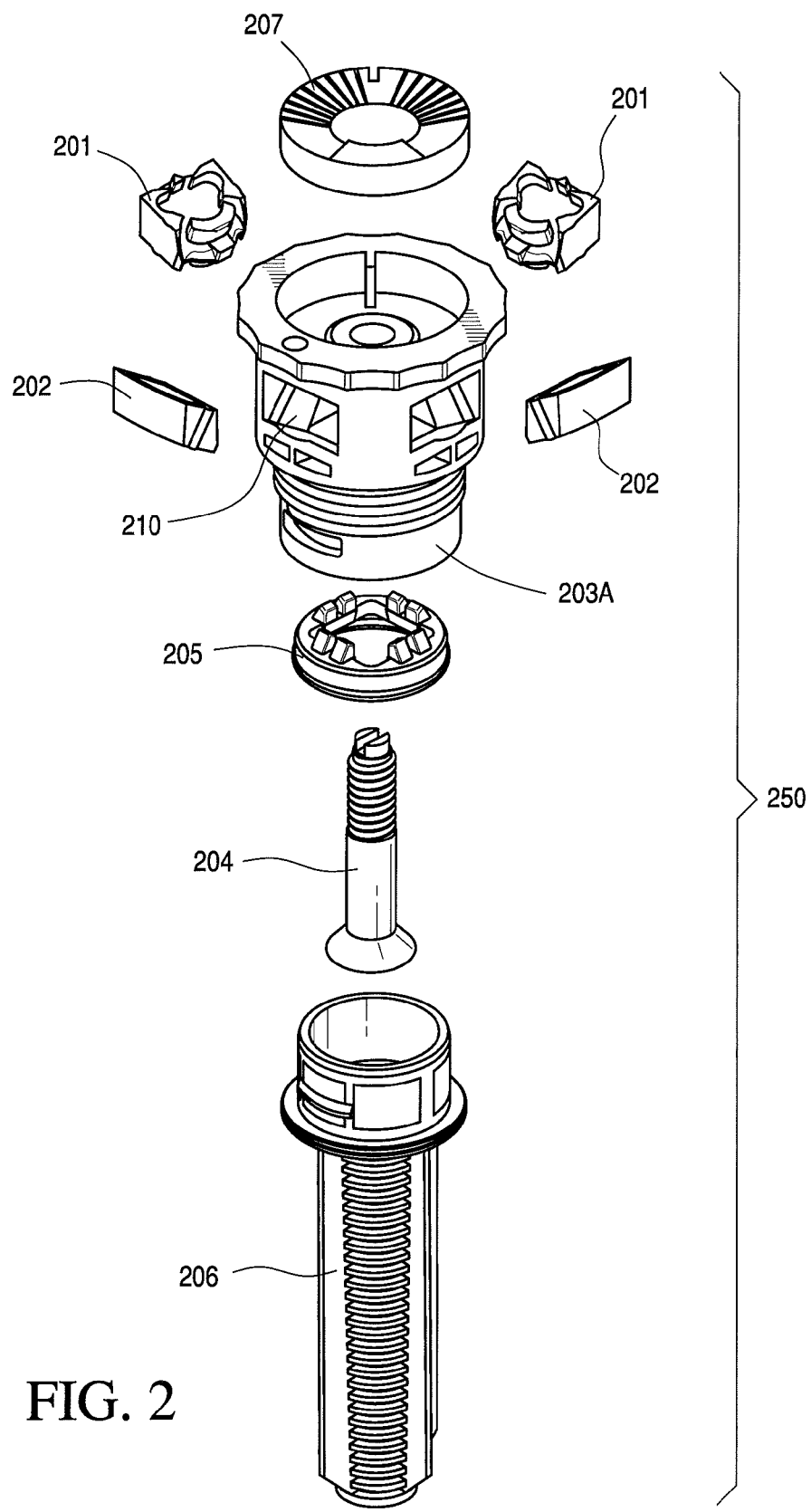
Figure 20:
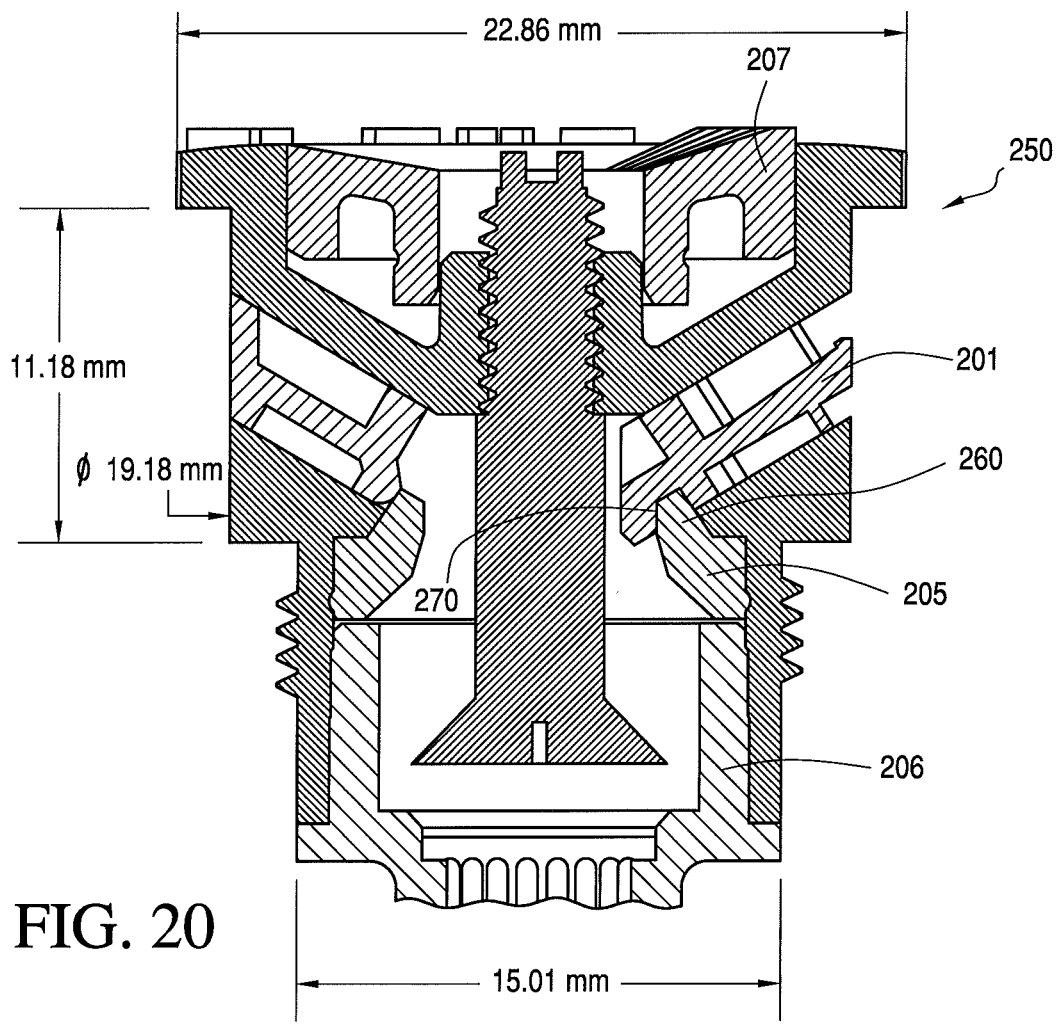
FIG. 20 illustrates a side cross section of the nozzle assembly of FIG. 2, including the retaining ring of FIG. 19 in-situ and securing up to four fluidic inserts in their slots, in accordance with the present invention.
Figure 21:
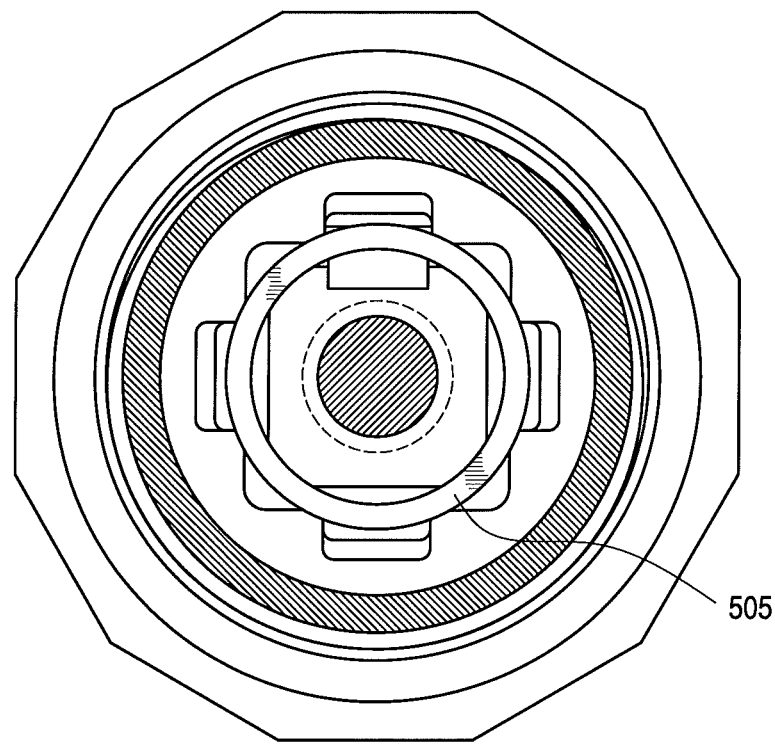
FIG. 21 illustrates a bottom or interior view of an alternate embodiment nozzle assembly having an internal spring steel ring instead of the retaining ring of FIG. 19; the spring steel ring is shown in-situ and securing up to four fluidic inserts in their slots, in accordance with the present invention.
Figure 22:
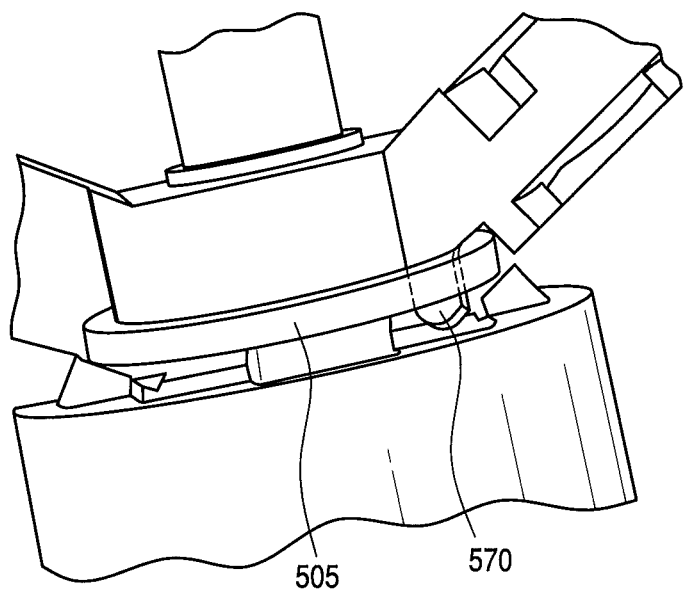
FIG. 22 illustrates a side cross section of the nozzle assembly of FIG. 21, including the steel retaining ring of FIG. 21 in-situ and securing up to four fluidic inserts in their slots, in accordance with the present invention.

An alternative embodiment is illustrated in FIG. 2, which shows an exploded perspective view of fluidic pop-up irrigation nozzle assembly 250 which is also adapted to receive from one to four fluidics 201 (i.e., chips or fluidic inserts) and from one to three blanks 202 in a housing 203A with four radially arrayed slots, a flow adjustment screw 204, and a ring-shaped retainer 205 configured to engage and retain the fluidic inserts (discussed in greater detail with FIG. 20, below).

Figure 3:
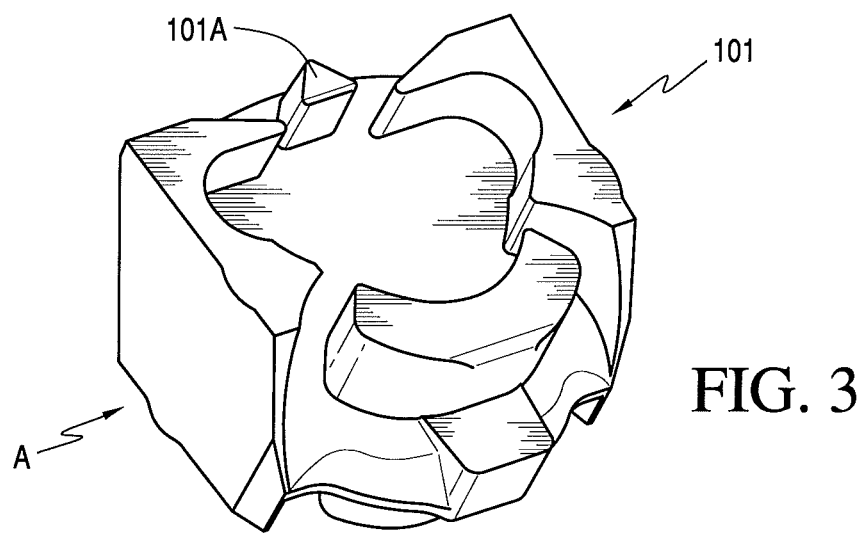
Figure 9:
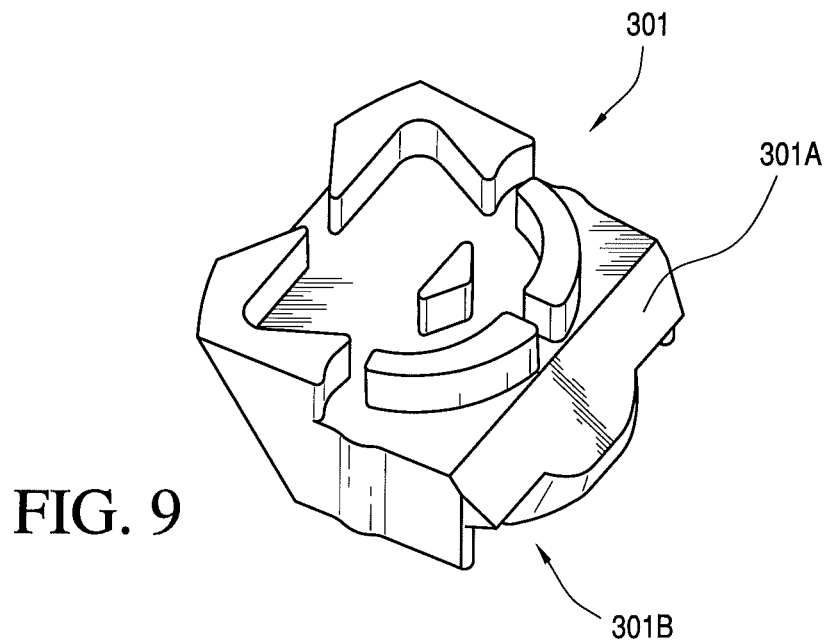
Figure 13:
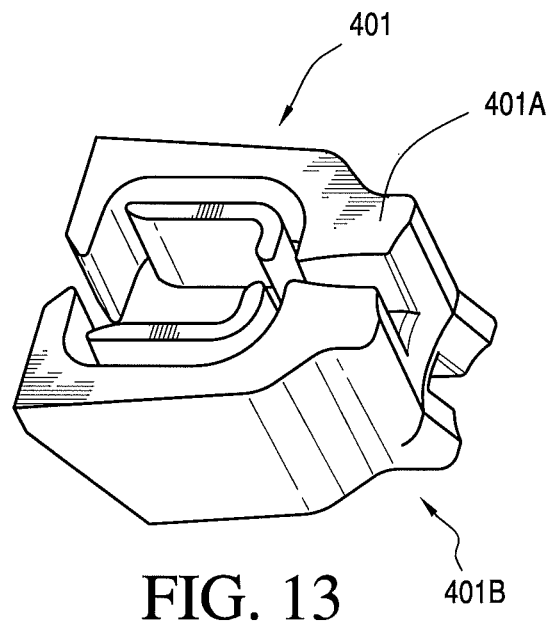
Figure 14:
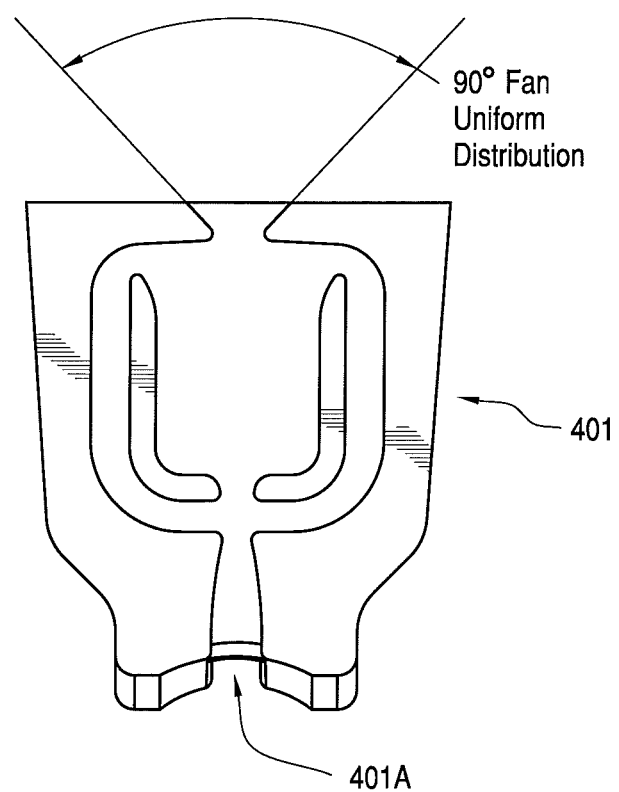
Figure 15:
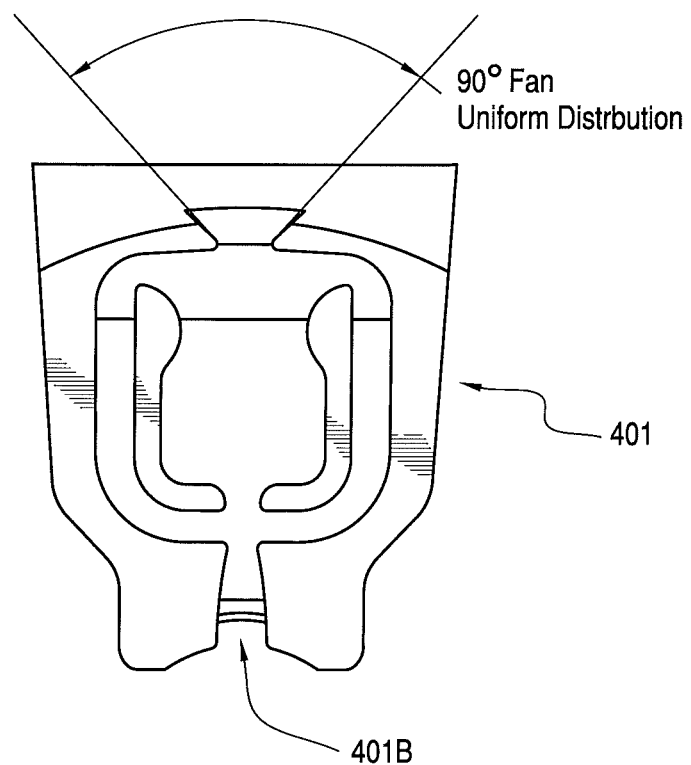
Figure 16:
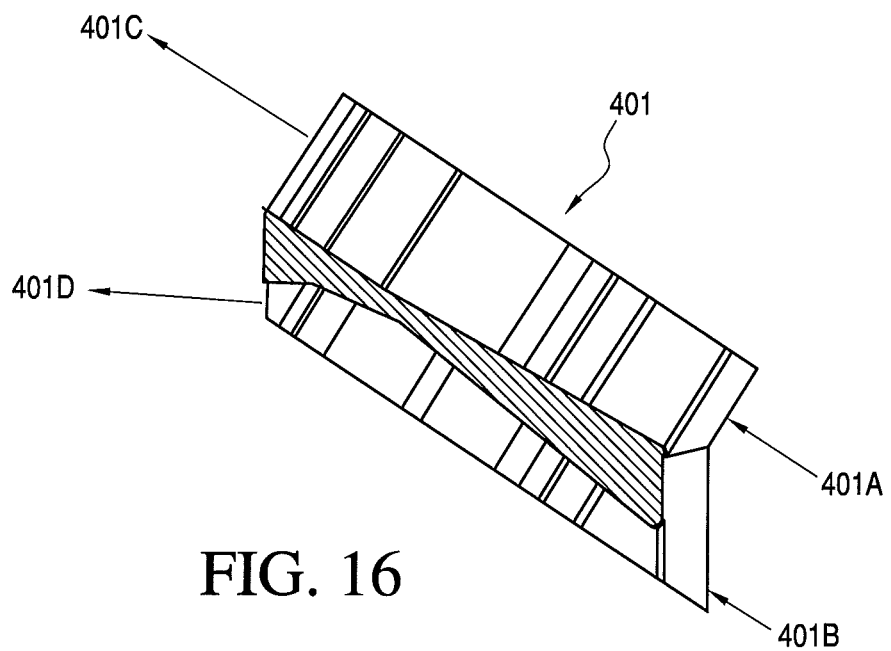
FIG. 16 illustrates, in cross section, the first and second inlets and first and second outlets of fluidic circuit C, with top and bottom feedback oscillators, with a top oscillator on one side of the fluidic chip or insert (see FIG. 14) and a bottom oscillator on the opposing side of the fluidic chip (as best seen in FIG. 15).
Figure 17:
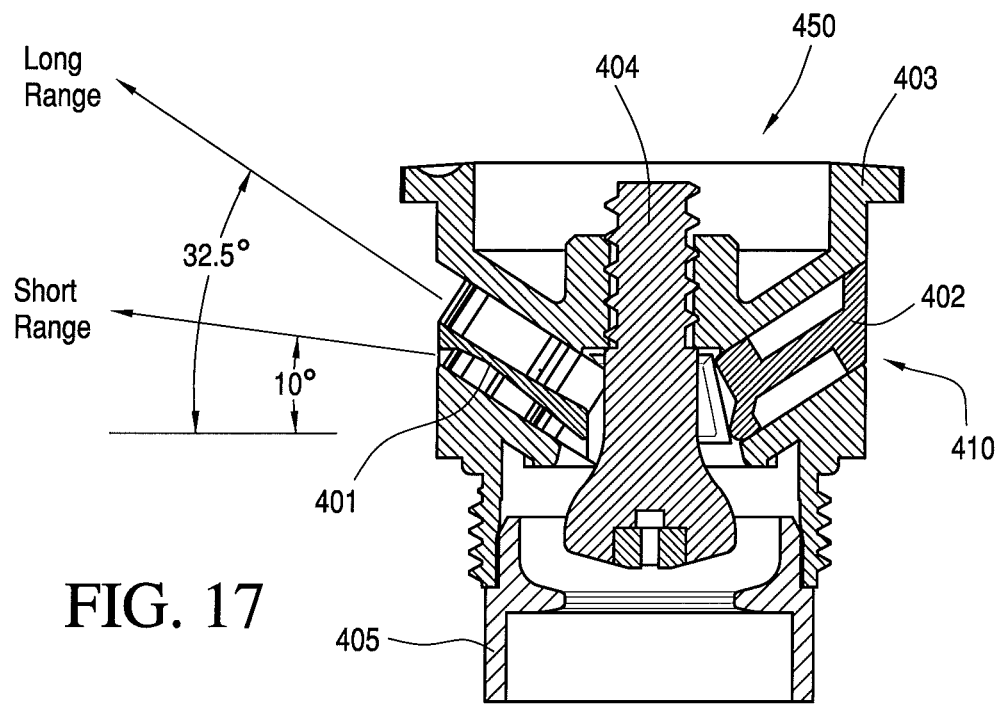
FIG. 17 illustrates, in cross section, the nozzle assembly including fluidic circuit C (of FIGS. 13-16), and illustrates the aim angles and spray trajectories for the top and bottom sprays emitted from the top feedback oscillator and the bottom feedback oscillator, respectively, in accordance with the present invention.
Figure 18:
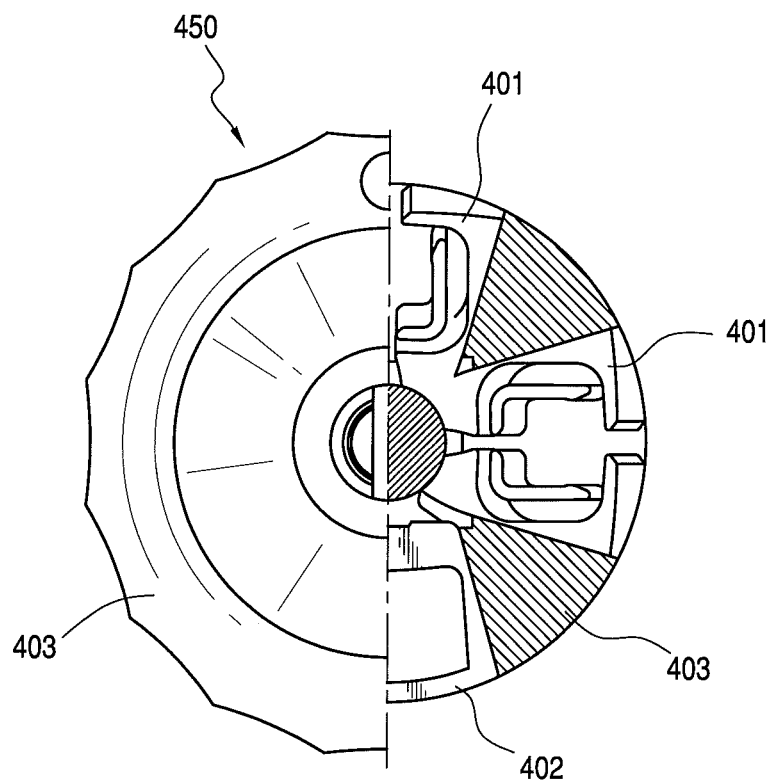
FIG. 18 illustrates a top view, in partial cross section, of a nozzle assembly having first and second fluidic inserts in adjacent slots, to provide an irrigation spray over a 180 degree (or half) spray, in accordance with the present invention.

Fluidic "chips" or inserts (e.g., A, B or C as shown in FIGS. 3, 9 and 13, respectively) have been developed for an irrigation system application resulting in a PR of about 1.0, which is the lowest in the industry for fixed (i.e., non-rotating, non-oscillating) sprays.

The sprays also have a good distribution or SC. In the embodiment of FIGS. 3-8, the insert comprises a double-spray circuit, with a 90 deg fan spray on top, above a 60 deg fan spray. Each of these sprays has bands of high droplet velocity and low droplet velocity. The long throw is a result of the high velocity bands while the short throw (or short radius or "near field") is irrigated by the low velocity bands. As noted above, the internal structures of the "Mushroom" oscillator of FIG. 5 are described in U.S. Pat. No. 6,253,782 (and an improved mushroom is described in U.S. Pat. No. 7,267,290); the "Double Spray" configuration is described in U.S. Pat. No. 7,014,131; and a "Split Throat" oscillator is described in U.S. Patent Application Publication 2007/0295840; the entire disclosure of each the foregoing patents and published applications are incorporated herein by reference.

Figure 4:
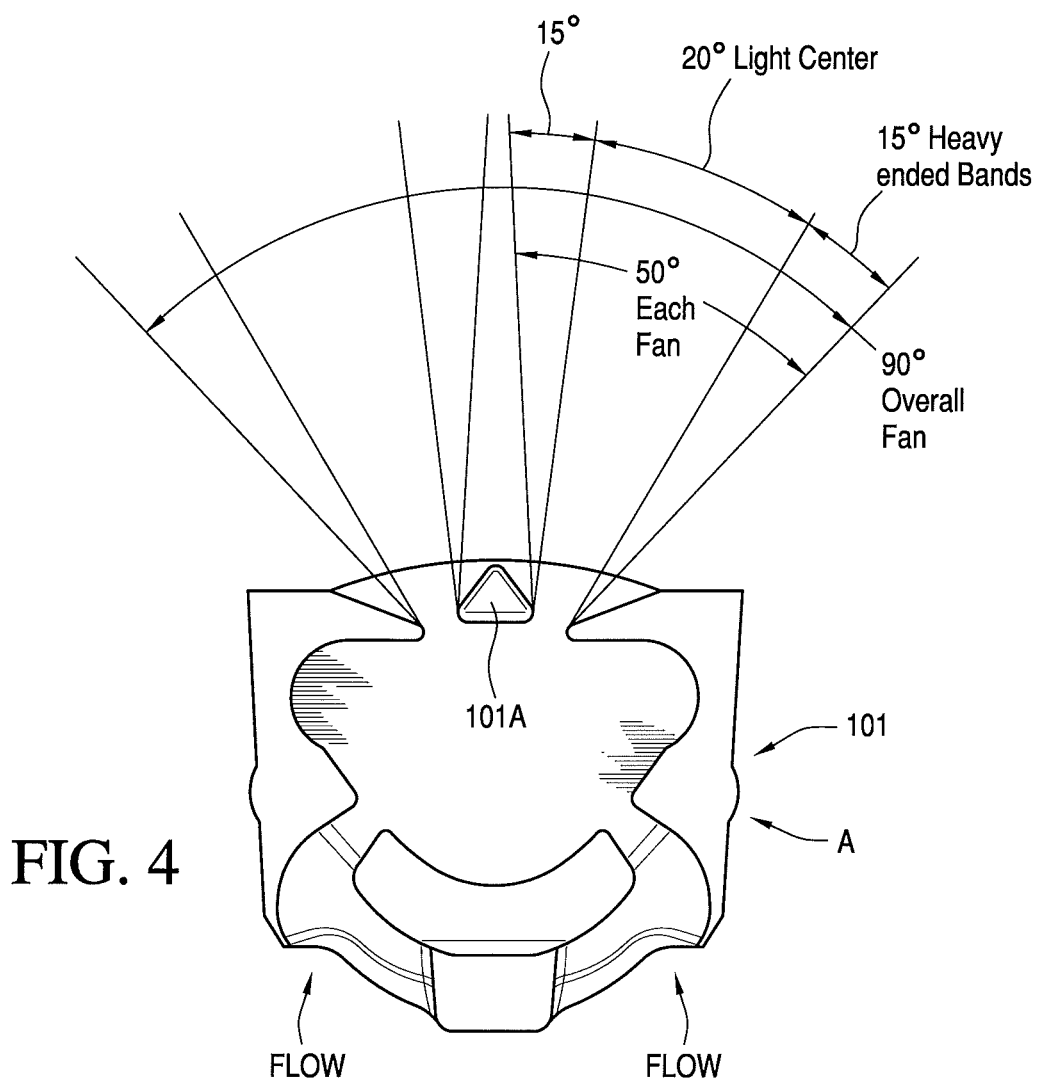

The fluidic circuit or insert 101 (or "A") is a split throat mushroom on one side and a standard mushroom on the other side. The split throat mushroom produces a 90 deg fan and enables an increase in droplet velocity of 20% compared to a standard mushroom with 90 deg fan. FIG. 3 illustrates, in perspective, fluidic circuit A or 101, a split mushroom oscillator, for longest throw in the smallest package with good distribution. Fluidic insert A includes a pair of the illustrated mushroom oscillators, with a top oscillator on one side of the fluidic chip or insert (see FIG. 4) and a bottom oscillator on the opposing side of the fluidic chip (as best seen in FIG. 5). FIG. 4 is the top view schematic diagram of fluidic circuit A showing the top split mushroom oscillator of FIG. 3, and the fan angles for the light center and heavy ended bands of spray are shown as part of the overall fan angle of spray.

Figure 8:
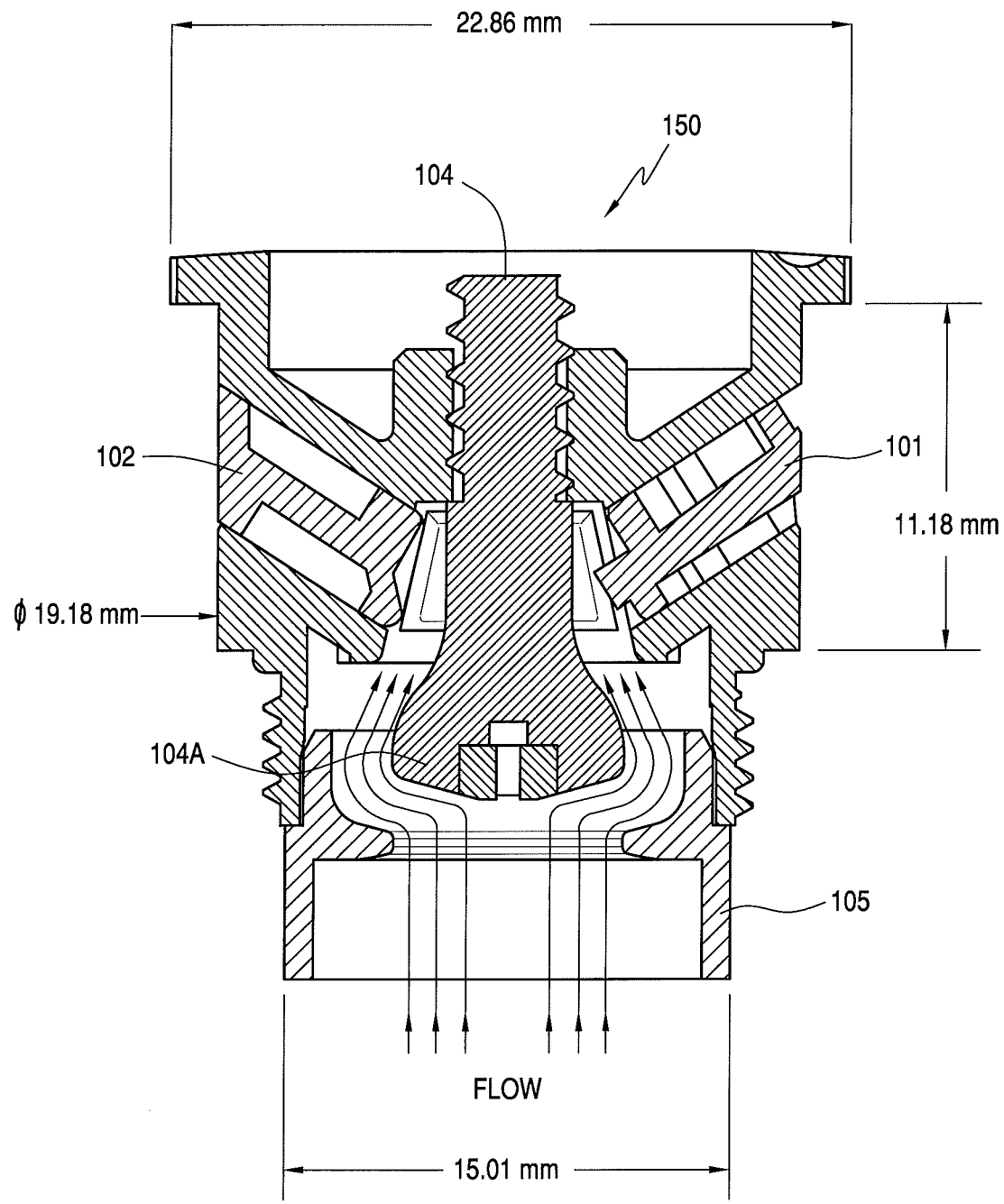

FIG. 5 is a bottom view schematic diagram of fluidic circuit A or 101 showing the bottom mushroom oscillator of FIG. 3; a light center spray region has a 20 degree fan angle and is between left and right heavy ended bands of spray which each have a fan angle of 20 degrees to provide an overall fan angle of 60 degrees. FIG. 6 is a cross section of nozzle assembly 150 showing fluidic circuit A (of FIGS. 2-5), and illustrates the aim angle and spray trajectory for the top spray (35 degrees above horizontal) as emitted from the top split mushroom oscillator. The aim angle and spray trajectory for the bottom spray emitted from the bottom mushroom oscillator is 32.5 degrees. FIG. 7 illustrates a top view, in partial cross section, of nozzle assembly 150 with first and second fluidic inserts 101 in adjacent slots, to provide an irrigation spray over a 180 degree (or half) spray area. FIG. 8 is a detailed cross section view, in elevation, illustrating flow and spray-radius control components. Each fluidic circuit 101 occupies a comparatively small space, and they are sensitive to irrigation fluid feed conditioning. In accordance with one aspect of the present invention, the 'PCD' is an optional pressure control device that may be installed in the PCD holder upstream of the shutoff. As noted above, radius adjustment screw 104 is threaded through the housing 103 and accessed by the user from above with a simple flat-bladed screwdriver. The radius adjustment screw 104 is used to change the amount of flow that enters the fluidic inserts 101 and therefore affects the throw radius of the spray. PCD (pressure compensating device) holder 105 is press-fit onto the bottom open end of housing 103 and acts as a restrictor and shutoff (or valve seat) for the proximal valve plug end of radius adjustment screw 104. It also seals against filter basket 106, which provides prevents debris larger than a certain size from entering the inserts 101 and clogging them, and can serve to hold a PCD gasket, an optional item that can be used to help stabilize flow under varying supply pressure. FIG. 1b shows an alternative embodiment 152 including an optional indicator ring 107 which is dimensioned to be press-fit on top of the housing 103 and serves to indicate to the user the nominal throw radius and the spray arc. The nominal throw is indicated visually by text and color (with different colored rings 107 to indicate different throw radii).

Flow Control:

In the embodiments of FIGS. 1A-18, the control of fluid flow through the irrigation nozzle assembly (e.g., 150 or 152) is enabled by a flow-conditioning smoothly contoured screw head shutting off on a PCD holder 105 (or on a filter basket interface (not shown)). The flow-conditioning contoured shape of the head has been experimented with and an optimal one is illustrated. The hole size on PCD holder 105 has also been seen to adversely affect the performance and an optimal hole size of 6.5 mm has been chosen. Hole sizes less than 6.5 mm may also be used for the given screw head while larger sizes result in poor performance, especially during shut off. Hole sizes in the range of 6.5 mm or less are believed, at present, to work well for nozzle assemblies used in applications requiring smaller throws.

Returning to FIGS. 3-7, fluidic circuit A (or 101) has opposing (top and bottom) sides, with a split mushroom oscillator on top and a mushroom oscillator on the bottom. The illustrated circuit embodiment (providing the longest throw in the smallest package with good distribution) comprises a pair of mushroom oscillators wherein the two oscillator outputs are at nearly the same angle from horizontal (best seen in FIG. 6), so both outputs contribute to the far field of the nozzle's spray distribution. The mushroom oscillator is also preferred because it is most resistant to the turbulence caused by the flow control.

The 'top' mushroom oscillator (diagrammed in FIG. 4) utilizes a split throat geometry to allow it to fan at 90° (or slightly more to fill quadrant-to-quadrant gaps) using an area ratio that would normally produce a smaller fan angle, about 50°. The smaller area ratio allows this circuit to have about a 20% higher exit velocity than a mushroom oscillator with an area ratio that produces a 90° fan with the same flow rate, allowing this oscillator to have a longer range. Also, the normally heavy ended distribution of the mushroom oscillator is divided into four 15° heavy ended bands in the split throat (around 101A) instead of the typical 20° heavy ended bands that would exist in a 90° output from a non-split throat version.

The 'bottom' mushroom oscillator (diagrammed in FIG. 5) is a 60° fan designed to have 20° heavy ended bands. An overlay of the top and bottom fans reveals that the top and bottom fans are complementary. The heavy ended bands of the bottom mushroom fill the voids in the light centers of the top split throat mushroom to create a uniform distribution. The light centers of the fans have lower velocity and droplet size than the heavy ends and, therefore, their spray output contributes to the near field of the distribution.

Fluidic circuits (e.g., 101, 201, 301 or 401) are inserted in one, two, three or four slots (e.g., 110) in the housing (e.g., 103, 203 or 403) to produce fan angles from 90° (for using only one fluid for one quadrant) to 360° (using four fluidics to spray into all four quadrants). The remaining slots are filled with blanks (e.g., 102, 202 or 402). Other fan angle combinations can also be used.

Referring now to FIG. 8, a provision is made allowing an installer or maintenance specialist to adjust flow control the radius of the spray. Fluidic circuits (e.g., 101, 201, 301 or 401) in a comparatively small space are sensitive to feed conditioning. Excessive upstream turbulence will reduce the fan angle output of the fluidic. The flow control illustrated in FIG. 8 was designed to reduce turbulence enough to allow the fluidics to operate, especially as adjustment screw 104 is moved closer to the shutoff on the PCD holder 105. The 'PCD' is a pressure control device that may or may not be installed in the PCD holder upstream of the shutoff.

Figure 11:
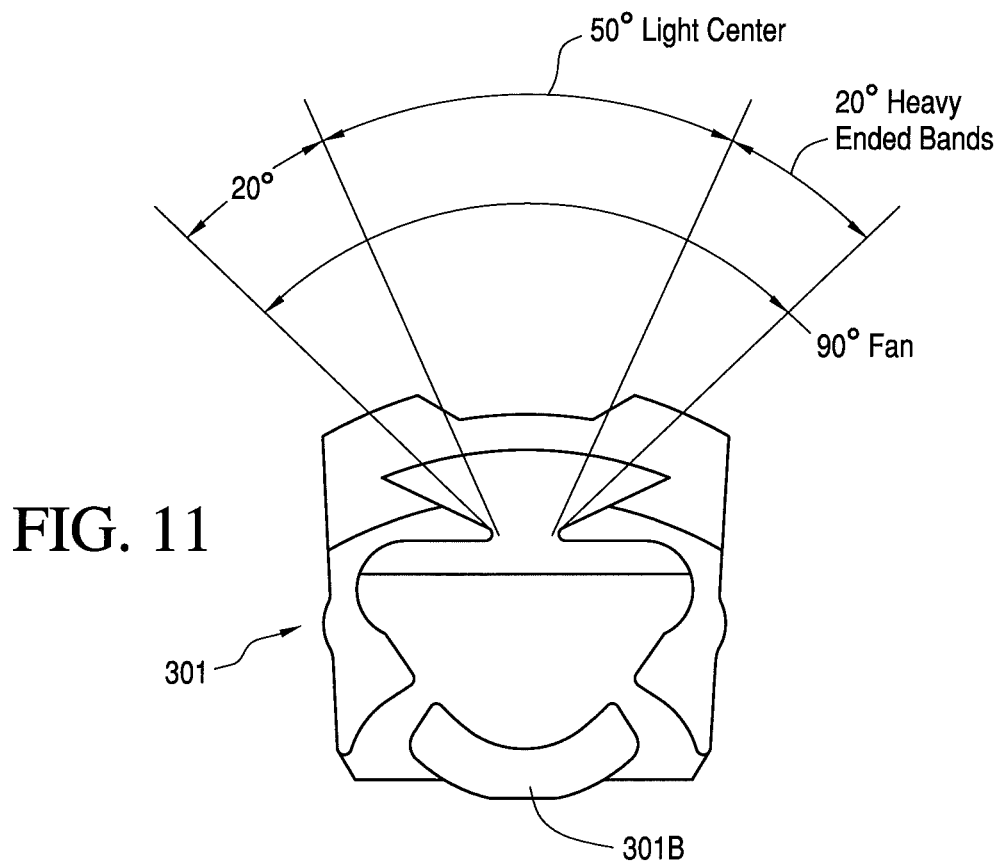

Turning now to another embodiment shown in FIGS. 9-12, Circuit B, or fluidic circuit chip 301 is a two-sided structure with a 3-jet island oscillator 301A on top opposite a mushroom oscillator 301B on the bottom. FIG. 9 illustrates, in perspective, fluidic insert B, with a three jet island oscillator, the insert or chip 301 which provides the longest throw in the smallest package with good distribution of spray by superimposing the spray from the three jet island oscillator 301A on the top side of the fluidic chip or insert (see FIG. 10) with the spray from the bottom oscillator 301B on the opposing side of the fluidic chip (as best seen in FIG. 11). FIG. 10, the top view schematic diagram of fluidic circuit B shows the top three jet island oscillator's 50 degree uniform fan angle. FIG. 11 illustrates the bottom view of fluidic circuit B, showing the bottom mushroom oscillator's the fan angles. A 50 degree light center fan is surrounded by substantially symmetrical 20 degree heavy ended bands of spray to generate an overall fan angle of ninety degrees.

Figure 12:
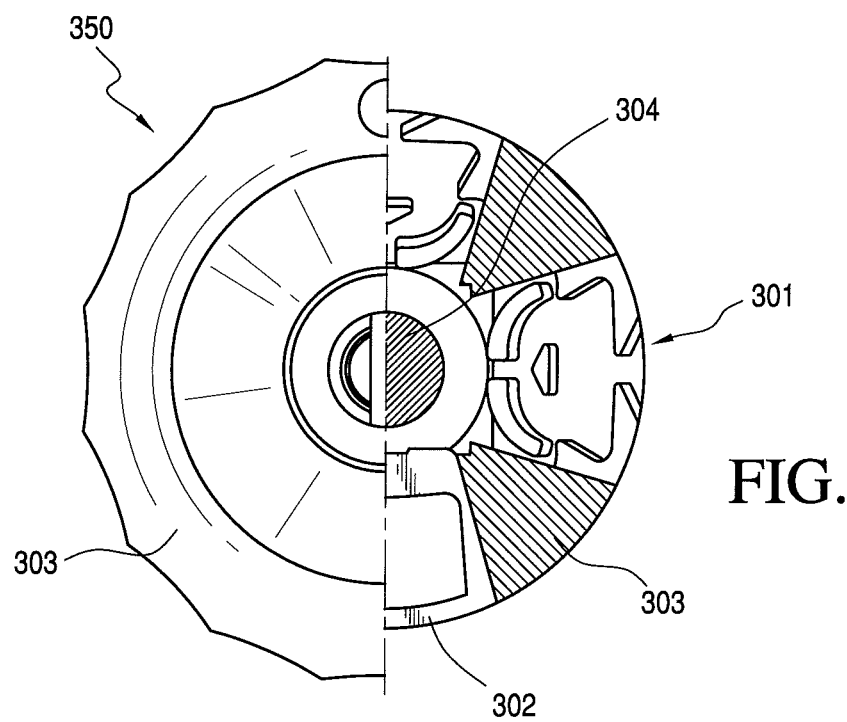

FIG. 12 is a top view, in partial cross section, for nozzle assembly 350 including a an insert 301 (fluidic circuit B), the 3-jet island oscillator with mushroom oscillator; applicants observed that this combination can give better distribution than nozzle assembly 150 when using circuit A, but noted that the three jet island oscillator does not maintain fan angle well when the flow and radius control is introduced. As noted above, the internal structure of the "Three Jet" oscillator is described in U.S. Patent Application Publication 2005/0087633, the entire disclosure of which is also incorporated herein by reference.

Since the 'top' 3-jet island oscillator 301A produces a uniform 50° fan and the 'bottom' mushroom oscillator 301B produces a 90° fan with 20° heavy ended bands, an overlay of the two fans shows that the top and bottom fans, when superimposed, are complementary. The uniform 50° fan of the top spray fills the light center of the 90° fan of the bottom spray. Both sprays target the far field, while the smaller drops and lower velocity of the light center of the bottom spray contribute to the near field.

As before, the inserts, chips or circuits (e.g., 301) are inserted in one to four slots in the housing to produce fan angles from 90° to 360°. The remaining slots are filled with blanks 302. Other fan angle combinations can also be used.

Turning now to FIGS. 13-18, insert 401 includes top and bottom feedback oscillators: This combination can give very good distribution and has larger droplets than circuits A and B to fight wind drift, but requires a significantly larger nozzle assembly package and does not operate as well as circuit A when the flow and radius control is introduced. FIG. 13 illustrates, in perspective, insert 401 or fluidic circuit C, a feedback oscillator chip, which includes top and bottom feedback oscillators, with a top oscillator on one side of the fluidic chip or insert (see FIG. 14) and a bottom oscillator on the opposing side of the fluidic chip (as best seen in FIG. 15). FIG. 14 illustrates a top view schematic diagram of fluidic circuit C showing the top feedback oscillator's 90 degree uniform fan angle for the spray. FIG. 15 illustrates a bottom view schematic diagram of fluidic circuit C showing the bottom feedback oscillator's 90 degree uniform fan angle for the spray. The top feedback circuit's spray is projected at a higher angle, for long range throw, as shown in FIG. 16 which also illustrates, in cross section, the top feedback circuit's inlet 401A and the top feedback circuit's outlet 401C. Top oscillator is on one side of the fluidic chip or insert 401 (see FIG. 14) and a bottom oscillator on the opposing side of the fluidic chip (as best seen in FIG. 15). The bottom feedback circuit's spray is projected more nearly horizontal, for short range throw, as shown in FIG. 16 which also illustrates, in cross section, the bottom feedback circuit's inlet 401B and bottom feedback circuit's outlet 401D.

FIG. 17 illustrates, in cross section, nozzle assembly 450 including insert 401 or fluidic circuit C (of FIGS. 13-16), and illustrates the 32.5 degree aim angle and 'long range' spray trajectories for the top sprays emitted from the top feedback oscillator. The bottom feedback oscillator provides a smaller, more nearly horizontal 10 degree aim angle for the 'short range' spray trajectory. FIG. 18 illustrates a top view, in partial cross section, of a nozzle assembly having first and second fluidic inserts 401 in adjacent ports or slots 410, to provide an irrigation spray over a 180 degree (or half) spray covering two adjacent quadrants.

As in the other embodiment described above, the interior sidewall surfaces of each port or slot 410 are preferably dimensioned for cost effective fabrication using molding methods and preferably include sidewall grooves positioned and dimensioned to form a "snap fit" with ridges or tabs in mating inserts (e.g., 401) or blanks (e.g., 402).

For nozzle assembly 450, the 'top' feedback oscillator produces a relatively uniform 90° fan that targets the far field (long range), and the 'bottom' feedback oscillator produces a relatively uniform 90° fan that targets the near field (short range). A kit can be configured with one to four inserts or chips 401 for insertion in one to four slots 410 in the housing to produce fan angles from 90° to 360°. The remaining slots, if any, are filled with blanks 402. Other fan angle combinations can also be used.

Testing of prototype fluidic irrigation assemblies such as those shown in FIGS. 1A-18 was undertaken, and performance data was recorded from the performance testing on the 15' Family samples, namely, 4 qty. 15F (full), 1 qty. 15Q (quarter), 1 qty. 15H (half), and 1 qty. 15TQ (three quarter). The maximum radius on the 15F was 18 ft (one at 20 ft), as seen by a center "bulge" in the distribution layout. For the 15F, all SC values were 1.5, and the PR was about 0.95 (using 15' rect. spacing), and this performance is considered to be significantly better than prior art sprinklers.

| Unit | SC | PR (theoretical) |
|---|---|---|
| 15F | 1.5 | 0.94-0.97 |
| 15H | 1.4 | 1.04 |
| 15Q | 1.2 | 0.96 |
| 15TQ | n/a | 1.04 |

SC values are expected to improve further with added development and adjustment (e.g., should get better with center "bulge" brought in on fixed sprays, assuming same spray uniformity.

Special Considerations for Pressure Spikes in Sprinkler Assemblies

As noted above, sprinkler systems used for irrigating lawns and parks must be serviced periodically, to prevent damage from expansion of freezing water in the pipes and sprinkler heads. Annually, the systems are cleared of water, often with compressed air, to drive all water out of the pipes and sprinkler components. The following spring, water is re-introduced into the system and that water must first displace the air in the pipes.

Recent advances in fluidics technology have been evaluated for use in irrigation systems, and these new fluidic circuits provide significantly different hydraulic impedance to the flow of water, when compared to an open spray nozzle, so the introduction of water into a system having trapped air in the lines presents a new challenge. Specifically, the applicants have discovered a problem with a fluidic equipped sprinkler or nozzle assembly. The issue was that under some conditions, mainly after winterization of a residential or commercial irrigation system, there is an air void in the plumbing leading up to the fluidic equipped nozzle. When the water is turned back on to the system, a wave of water travels at a high rate of speed down the plumbing, displacing the air. This instantaneous impact created by the density difference between the remaining air void and wave of water generates excessive loads that can damage a fluidic nozzle insert (e.g., 101) or force it out of the housing. The impact force produced by the "surge" turns out to be quite high, close to 30 lbf. This impact force is accommodated by use of a new fluidic insert retaining structure.

Figure 19:
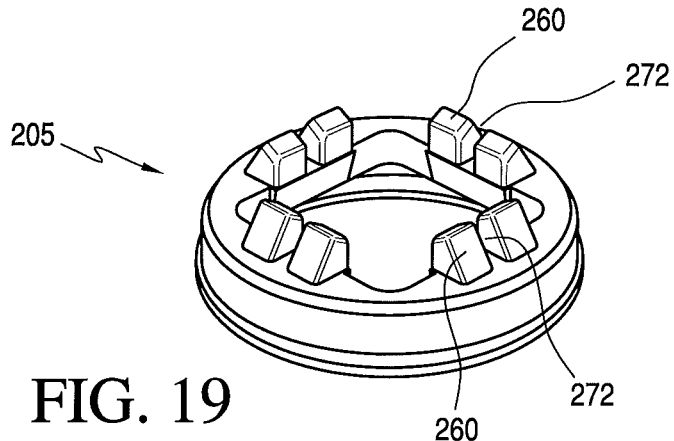
FIG. 19 illustrates a perspective view, of a retention ring configured for insertion into the nozzle assembly of FIG. 2, to secure up to four fluidic inserts in their slots, in accordance with the present invention.

Referring now to FIGS. 2 and 19-22, sprinkler assembly 250 includes a sprinkler housing 203A including an interior lumen and an exterior sidewall, with at least one fluidic-circuit-receiving port or slot 210 carrying a fluidic insert 201 configured to receive irrigation fluid passing into the housing lumen and, in cooperation with the port or slot 210, passes irrigation fluid and projects the irrigation fluid in a desired spray pattern. Fluidic insert 201 is held precisely in place by a retention ring 205 (as shown in FIGS. 2, 19 and 20 adapted for insertion into the housing's interior lumen to provide a snap or friction fit with the fluidic insert 201. Retention ring 205 fits into the pre-existing sprinkler housing or package, is preferably molded of plastic material and is made as a single component for economic purposes, and does not have any effect on external appearance or fluidic performance as other more traditional fasteners would.

FIG. 2 is an exploded perspective view of fluidic pop-up irrigation nozzle assembly 250 which is adapted to receive from one to four fluidics 201 (chips or fluidic inserts) and from one to three blanks 202 in housing 203A with four radially arrayed and equally spaced ports or slots 210, a flow adjustment screw 204, and retention ring 205 that bears against filter 206 which has a shutoff interface surface. Housing 203A defines a substantially tubular fluid-impermeable structure that is symmetrical around a vertical axis, with a top or distal flange and a segment of exterior threads extending from the proximal or bottom end of the exterior sidewall. As can be seen in the cross sectional view of FIG. 20, the housing sidewall includes an array of up to four upwardly angled slots 210, each defining a substantially rectangular aperture with smooth interior slot wall surfaces. As in the other embodiments described above, the interior sidewall surfaces of each port or slot 210 are preferably dimensioned for cost effective fabrication using molding methods and preferably include sidewall grooves positioned and dimensioned to form a "snap fit" with ridges or tabs in mating inserts (e.g., 201) or blanks (e.g., 202).

In an alternative embodiment, the fluidic oscillators 201 are permanently bonded within the slots, or are integral with the housing's exterior surface.

As with the embodiments described above, nozzle assembly 250 is configured with a housing 203A that will work in standard exterior sprinkler systems, with a substantially cylindrical exterior sidewall having an outside diameter of 19.18 mm, an axial length of 11.18 mm, which terminates distally in an transverse flange having an outside diameter of 22.86 mm and carries, on its proximal end, a narrower threaded proximal tubular segment with an outside diameter of 15.01 mm. While the illustrated embodiment is "male" meaning that the proximal segment carries external threads (e.g., ⅝-28), the nozzle assembly is also readily configured as "female" meaning that the connecting threads are carried within the proximal tubular segment's interior sidewall, near the proximal end holding snap-in filter segment 206.

One, two, three or four fluidic circuit inserts or chips 201 are dimensioned to be tightly received in and held by the radially arrayed slots 210 defined within the sidewall of housing 203A. The slots 210 provide a channel for fluid communication between the housing's interior lumen and the exterior of the housing. There are also between one and three plugs 202 which are also dimensioned to fit tightly within housing slots 210, and those slots fitted with a plug 202 are sealed and thus prevent any fluid passing between the housing's interior and the housing's exterior in the radial direction of the sealed slot. Housing 203A has a distal or top closed end with an annular distal flange and a dished or recessed circular end wall having a vertical and axially aligned, threaded bore that threadably receives axially aligned adjustment screw 204. The distal end or top of adjustment screw 204 preferably includes a transverse slot sized to receive a slotted screw driver. Adjustment screw 204 has an elongate shaft with threads extending from the distal end to a central portion of the shaft and the proximal end or bottom of adjustment screw 204 includes a frustoconical head which defines a flow-restricting valve plug end that can be sealed against the upper surface or interface of filter 206.

The control of fluid flow and the radius of the spray is provided by a flow conditioning proximal head of screw 204 which can be advanced to shut off fluid flow on the distal interface surface of filter 206. The shape of the head now preferred is illustrated in FIGS. 2 and 20. The central aperture or hole size on the filter has also been seen to adversely affect the performance and an optimal hole size of 7.3 mm has been chosen. Hole sizes less than 7.3 mm may also be used for the given screw head but affect max. flow, while larger sizes result in poor performance during shutoff. Holes sizes in the range of 7.3 mm or less are believed, at present, to work well for nozzle assemblies used in applications requiring smaller throws. The proximal head of screw 204 is designed such that the head diameter is larger than the seal shutoff hole diameter on the filter basket (7.3 mm) by some minimum amount. The seal shutoff hole diameter is a minimum size for the flow requirements, and the head diameter is a maximum size for annular flow around the upper ID of the filter basket 206. Design and experiment shows this head diameter to be 7.59 mm and the seal shutoff diameter to be 7.29 mm in the preferred embodiment for the 15 ft throw configurations. The bottom of the head and seal shutoff area are also designed to deflect the irrigation fluid radially outward (away from the lumen's central axis) to help condition the flow prior to entering the chip 201. This is achieved with the preferred embodiment with sharp edge on the seal shutoff area of the filter basket.

Retention ring 205 can be customized to fit into other commercial sprinklers or Fluidic Nozzle housings. Sprinkler assembly 250 has the cylindrical interior lumen or passage and latching retention ring 250 is inserted into that lumen (pushed into the ID of the housing from underneath). Upon complete insertion, tab features 260 mate to a "tail" or latch interface 270 on fluidic insert 201 that has been installed in sprinkler assembly 250. The latch "tail" 270 on fluidic insert 201 allows fluidic inserts to be assembled normally into housing 203A without any special tooling features or assembly processes. The insert "tail" 270 also has a web and gusset for additional strength. In order to accommodate the webbing on the insert "tail" 270 there is a slot 272 cut in each latch point on the retention ring. The latch point on the retention ring is widened to ensure that the proper level of shear area is retained for the stresses and strains the part is subjected to under the hydraulic surge's mechanical load (i.e., during surge). Tab features 260 and central square opening in retention ring 205 are strategically positioned to avoid disruption of flow conditioning prior to irrigation fluid entry into the inlet of insert 201.

Retention ring 205 is retained in housing 203A by a snap undercut or groove cut into the interior wall of the housing. Retention ring has a circumferential raised boss or ridge dimensioned to snap-fit into the housing's snap undercut, thereby securing the retention ring in place and latching any installed fluidic insert 201 in place. This is a critical aspect since applicants have found that if the ring is allowed to move, then insert retention is compromised. Further to that applicants are relying on the filter 206 to serve as a backup support to stop the retention ring from flexing or moving under the forces of the hydraulic surge.

Retention ring 205 is preferably molded out of a conventional plastic resin as used in the rest of the sprinkler assembly. Similar material selection guarantees that there are no unexpected chemical or environmental reactions with other subcomponents. If needed, for added strength, the ring can be molded from a resin with glass reinforcement.

Applicants have determined that nozzle assembly 205 provides a uniquely advantageous solution to the problem because it will fit into the pre-existing package, allows the use of plastic material and a single component for economic purposes, and does not have any effect on external appearance or fluidic performance as other reinforcing fasteners would. Furthermore the retention ring concept is readily adapted for use in other sprinkler head-Fluidic Nozzle housings. Due to a number of manufacturing requirements, applicants were not able to implement other designs to retain the inserts in the housing. Some ideas that were considered include:
(a) ultrasonically welding the fluidic insert into the housing—this was not desirable as welding has been found to damage the critical spray geometry and affect performance;
(b) using an external spring steel ring—Placing a generic spring steel ring around the perimeter of the housing (e.g., 103) could achieve the purpose but requires enough space on the front of the fluidic inserts to capture the ring—this external ring also poses a potential problem in damaging annular seals on the sprinkler pop-up assembly; and
(c) "Nailing"—through an access hole in the housing; a metal or plastic rod could have been driven into the insert; although this is an extremely robust method it creates a number of issues. (i) It creates a leak path for the irrigation fluid, (ii) poor repeatability in installation force and location could damage critical spray geometry, and (iii) the added cost of multiple parts was deemed not economically feasible.

Another embodiment substitutes an internal spring steel ring 505 (see FIGS. 21 and 22) which engages and retains fluidic insert having a proximal ring engaging tail 570. It was observed that with an internal steel spring 505, the flow conditions into the nozzle feed areas would be partially obstructed by the spring's circular section, and so this alternative was deemed less desirable, but viable.

Special Considerations for Spray Pattern Uniformity

As noted above, a fluidic nozzle creates a stream of fluid that oscillates within an included angle, known as the fan angle. The distribution of the fluid within this fan will vary depending on the type of fluidic circuit used. For example, in a mushroom circuit (e.g., as shown in FIG. 5), the oscillating stream will tend to dwell briefly at the extremes of its travel, creating a fluid distribution or spray pattern that is called a heavy-ended fan. Some circuits may include a splitter (e.g., 101A as shown in FIG. 4), which can increase the maximum fan angle and spray velocity. In this case, the oscillating stream will tend to dwell on the splitter, causing a fluid distribution or spray pattern that is called a center-heavy fan.

Figure 24:
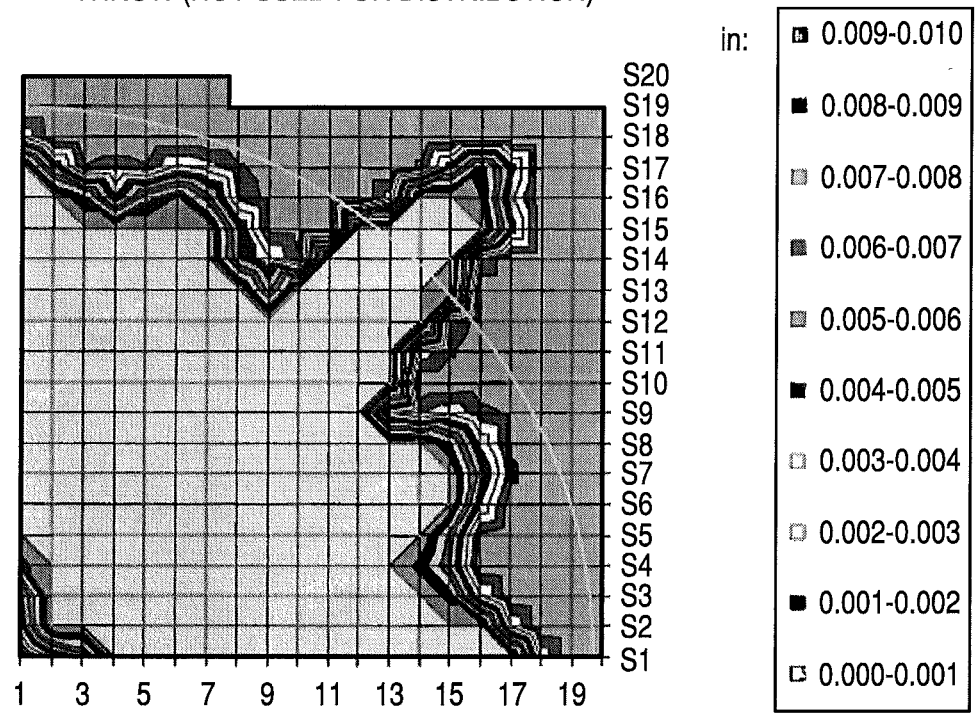
FIG. 24 is a contour plot illustrating measured uniformity of the spray emitted from the fluidic circuit providing "heavy bands" in their spray pattern (such as the fluidic circuits of FIGS. 4, 5 and 11), in accordance with the applicants' work in present invention.

The fluid distribution can be important in several applications for fluidic nozzles. In an irrigation nozzle, for example, it is desirable to distribute water evenly over a given area or shape (for example, a quarter circle.) If a heavy-ended fluidic were to be used in such a case, more fluid would be deposited on the edges of the spray, and less in the center. Furthermore, since the trajectory of the droplets is related to droplet size and velocity, the irrigation nozzle will tend to throw water further on the ends than in the middle. FIG. 24 shows an example irrigation spray that has several heavy bands.

Figure 23:
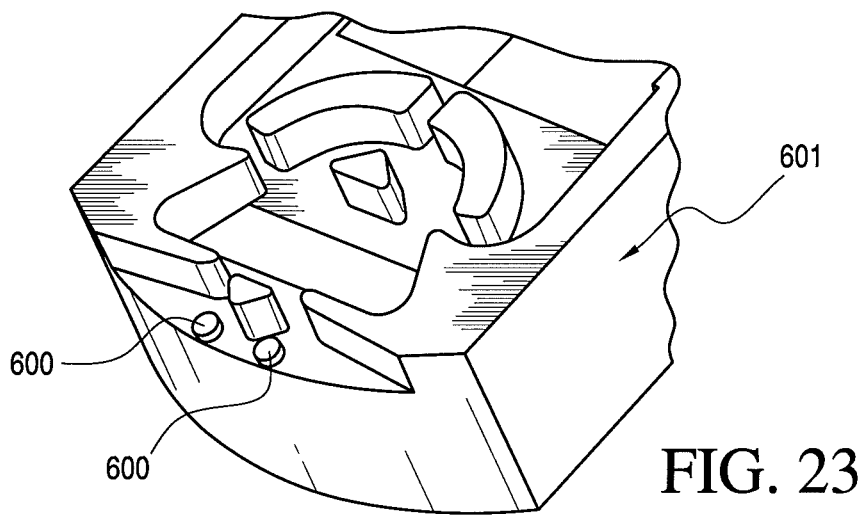
FIG. 23 is a schematic diagram showing a perspective view of a split fluidic circuit having first and second upwardly projecting protrusions or "bump" features at the outlet, to increase the uniformity of the spray emitted from the fluidic circuit, in accordance with the present invention.
Figure 25:
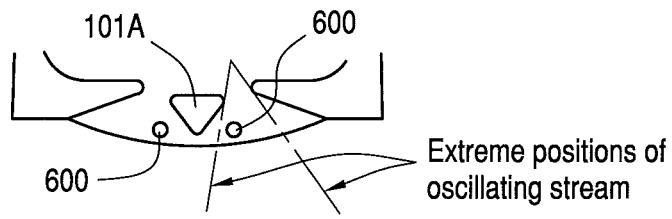
FIG. 25 is a top view of the split fluidic circuit of FIG. 23, illustrating diameter and lateral placement of the first and second upwardly projecting protrusions or "bump" features at the outlet, to increase the uniformity of the spray emitted from the fluidic circuit, in accordance with the present invention.

FIGS. 23-27 illustrate an embodiment for a fluidic circuit structure and method of the present invention. Referring to FIGS. 23 and 25, a pair of upwardly projecting cylindrical-section bumps or protrusions 600 are added to the floor of the circuit 601 downstream of the throat, near the heavy portion of the spray (see FIG. 25). In the illustrated embodiments, each bump or protrusion 600 is substantially cylindrical in shape, but other shapes may be used. The protrusion does not take up the entire the height of circuit 601.

In use, fluidic circuit 601 sweeps a stream of fluid back and forth across the outlet's opening. As the heavy stream passes over protrusion 600, the flow is diverted over and around the protrusion 600, and broken into smaller drops. When the stream continues on to the other extreme of its travel, it is not affected by protrusion 600. In the exemplary embodiment shown in FIG. 25, it was deemed desirable to smooth the heavy center of the spray without affecting the crisp edges of the spray. Therefore, first and second protrusions 600 are located closer to the outlet's vertical splitter 101A than to the outer edge of the spray.

Figure 26A:
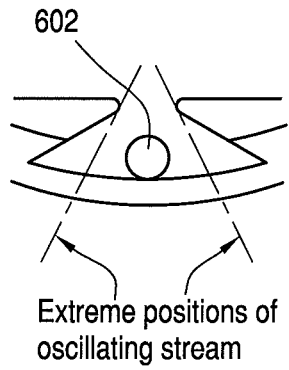
FIG. 26a is a top view of another fluidic circuit, illustrating diameter and lateral placement of a single upwardly projecting protrusion or "bump" feature at the outlet, to increase the uniformity of the spray emitted from the fluidic circuit, in accordance with the present invention.
Figure 26B:
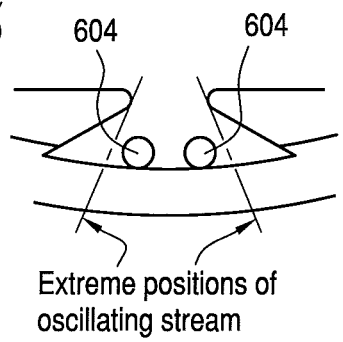
FIG. 26b is a top view of yet another fluidic circuit, illustrating diameter and lateral placement of a first and second upwardly projecting protrusions or "bump" features at the outlet, to increase the uniformity of the spray emitted from the fluidic circuit, in accordance with the present invention.

FIGS. 26a and 26b show two options for breaking up the heavy ends of spray. One large protrusion 602 can be used, centered within the sweep of the oscillating stream (FIG. 26a), or a spaced array of first and second protrusions 604 may be used, closer to the edges of the spray (FIG. 26b). For a wider fan, using two protrusions is thought to be more effective for redistributing the spray's heavy ends. However, two separate bumps may not fit under a narrower fan, so a single protrusion may be preferable. As noted above, the protrusions need not be circular in cross-section; an oval or racetrack-shaped protrusion is another option.

Figure 27:
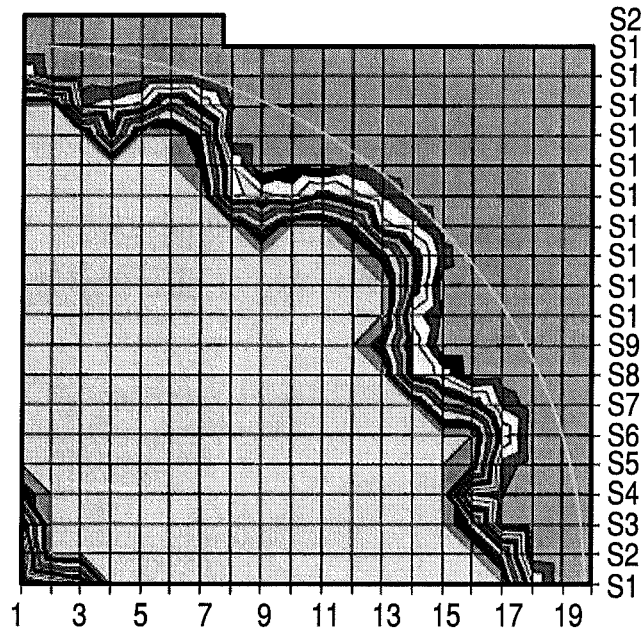
FIG. 27 is a contour plot illustrating measured improved uniformity of the spray emitted from the same fluidic circuit of FIG. 24, showing the substantial elimination of "heavy bands" in the spray pattern, in accordance with the present invention.
Figure 28A:
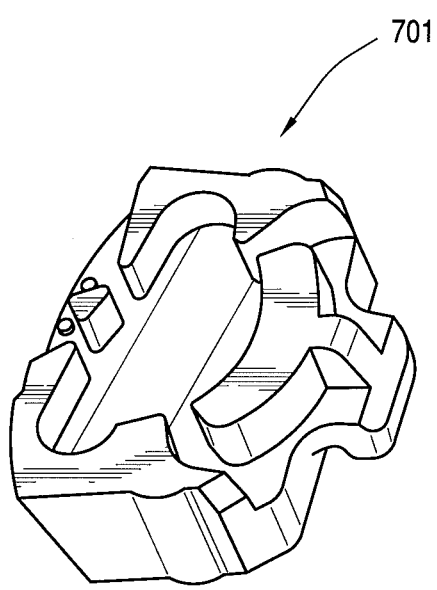
FIG. 28A illustrates, in perspective, a yawed mushroom oscillator adapted for use in the nozzle assembly of the present invention.
Figure 28B:
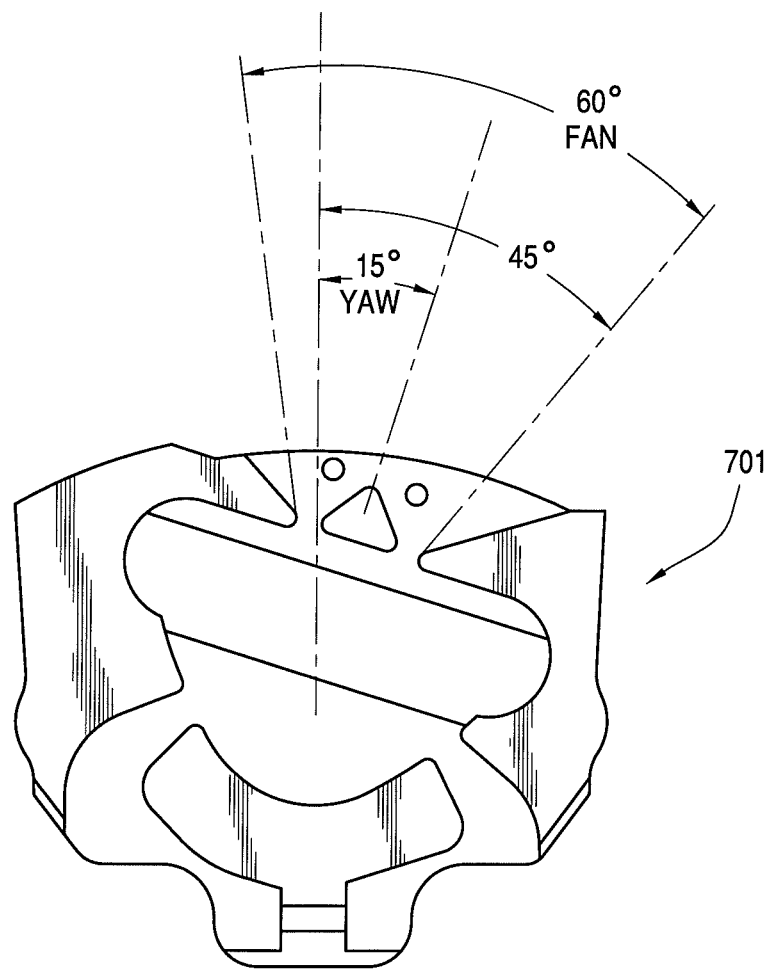
FIG. 28B illustrates a top view schematic diagram of the yawed mushroom oscillator of FIG. 28A, and the yaw angle and fan angle for the band of spray, in accordance with the present invention.
Figure 29A:
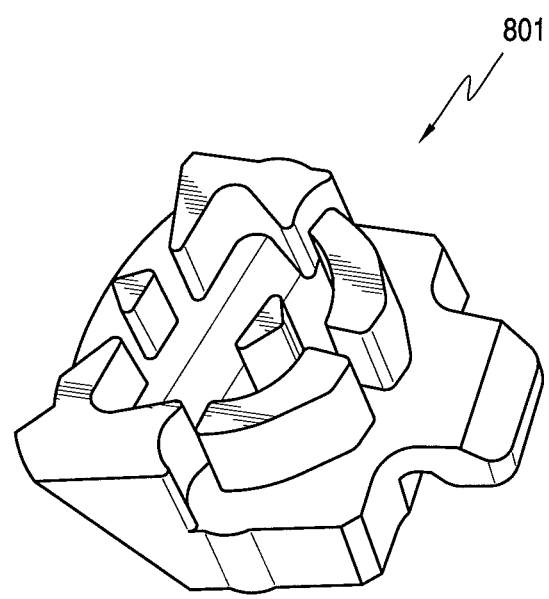
FIG. 29A illustrates, in perspective, a yawed 3-jet island oscillator adapted for use in the nozzle assembly of the present invention.
Figure 29B:
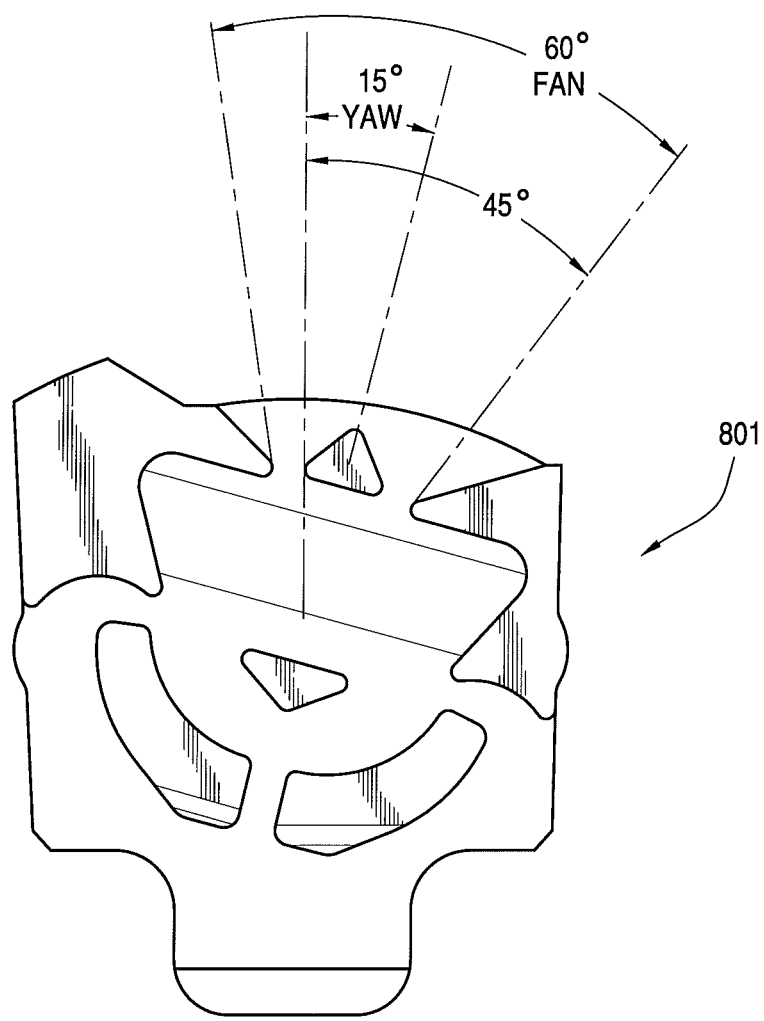
FIG. 29B illustrates a top view schematic diagram of the yawed oscillator of FIG. 29A, and the yaw angle and fan angle for the band of spray, in accordance with the present invention.

The effect of these protrusions on the fluidic's spray pattern is illustrated in FIG. 27, which shows the spray from a circuit similar to the one from FIG. 23, with added protrusions 600. The spray pattern's heavy spikes are suppressed and the spray pattern's uniformity across a selected azimuth is improved.

Larger protrusions will have more of an effect on the spray. Applicants were initially successful with protrusions 5-15% the height of the fluidic circuit's vertical extent, and later work has yielded beneficial results with protrusions or bumps with a height 5-15% the height of the fluidic circuit's vertical extent. The diameter of the protrusions can vary from a fraction of the throat width (as in the embodiment of FIG. 25) to the same order of magnitude as the throat width (FIG. 26*a*). In an exemplary embodiment, bumps 600 are cylindrical protrusions, 0.30 mm in diameter. The top of the bumps can be parallel to the top of the chip (as opposed to being parallel to the floor of the circuit, which has an upward taper). The upstream side of the bump is 0.109 mm tall, which is approximately 7% of the throat depth. The bumps are symmetric about the splitter, 1.507 mm from center to center. The upstream side of the bump is located 0.953 mm downstream of the bottom of the mushroom. In this case, the location of the bump has been chosen to coincide with the heavy end of the oscillating fan while it dwells on the center.

There are various applications for a fluidic circuit including the pattern-modifying bumps, in accordance with the present invention. For example, a lawn sprinkler pop-up head can include one or more fluidic circuits adapted to spray over a very specific area, preferably with optimum spray pattern uniformity or irrigation fluid distribution uniformity. An exemplary sprinkler assembly has a sprinkler housing (e.g., 103, as shown in FIG. 1A) with an interior lumen and an exterior sidewall, with at least one fluidic-circuit-receiving port 110 carrying a fluidic insert 601 configured to receive irrigation fluid passing into the housing lumen. In cooperation with the port, the fluidic circuit receives the fluid at its inlet and passes the irrigation fluid to its outlet, past or over the bumps 600, and projects the irrigation fluid outwardly in the desired spray pattern.

In addition to the exemplary embodiments shown in the Figs, it is possible to employ an embodiment using only one circuit. The mushroom circuit shown in FIGS. 3 and 4 can be used with no additional circuit. In configurations where the required throw and flow are less (8 foot and 10 foot throws), very tall speed bumps (30-40% of the throat height) can distribute enough of the heavy center band into the adjacent light regions to provide an acceptable distribution. The circuit could be placed on the top or the bottom of the chip. The top would be preferable if one wished to increase the aim of the spray, the bottom would be preferable if one wished to aim the spray downward. However, space on the bottom of the chip is very limited.

Those having skill in the art will recognize that the structures, apparatus and methods of the present invention make available a long throw Pop-Up Irrigation Nozzle assembly having no oscillating or rotating parts, with a cylindrical body having a fluid inlet and a sidewall defining at least one fluidic circuit that is configured to generate a selected spray pattern when irrigation fluid flows through the body. In order to throw long distance, droplet velocity, droplet size and droplet initial aim angle are used to determine the throw to provide a low precipitation rate ("PR") for fluidic sprays of irrigation fluid, whereby the nozzle assembly and method of the present invention achieve a PR of 1 in/hr or less and good spray distribution with a scheduling coefficient ("SC") of about 1.5, all without utilizing any moving components, and so provide a significantly more cost effective nozzle assembly, as compared to prior art rotator nozzles.

Testing of later developed fluidic irrigation assemblies such as those shown in FIGS. 2 and 20 was undertaken, and performance data was recorded from the performance testing on the 15' Family samples, namely, 15F (full), 15Q (quarter), 15H (half), and 15TQ (three quarter). The SC values and the PR performance are as follows:

| Unit | SC | PR (theoretical) |
|---|---|---|
| 15F | 1.3 | 0.9 |
| 15H | 1.2 | 1.0 |
| 15Q | 1.2 | 1.0 |
| 15TQ | 1.2 | 1.0 |

The nozzle assemblies illustrated herein may also be used with a "Yawed" fluidic oscillator as an insert (e.g., 701 or 801, as shown in FIGS. 28A-29B); the features of a "Yawed" oscillator are described and shown in applicant's U.S. Pat. No. 6,240,945, the entire disclosure of which is incorporated herein by reference. For example, a nozzle assembly can include 3-jet island oscillator 801 on an insert configured with only one oscillator (no bottom circuit). A 65 degree fan angle can be used (rather than 50 degree). Circuits 701 and 801 are each yawed 15°, and when combined with the mirrored version of this circuit and a Q insert, provides angles from 60 degrees to 360 degrees in discrete increments. For example, the illustrated 60° mushroom oscillator 701 and three jet island oscillator 801 (yawed 15°) allow arcs in 30° increments when combined with 90° oscillators and/or mirror image yawed 60° oscillators.

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention, as set forth in the following claims.

What is claimed is:

1. A sprinkler or irrigation nozzle assembly, comprising:

(a) a sprinkler housing including an interior lumen and an exterior sidewall, with at least one fluidic-circuit-receiving port defining a fluid passage between said lumen and said sidewall;

(b) a first fluidic oscillator circuit insert configured to receive irrigation fluid passing into said housing lumen and, in cooperation with said port, pass irrigation fluid in the form of an oscillating jet of irrigation fluid beyond said sidewall, projecting said irrigation fluid in a desired spray pattern of droplets;

(c) wherein said fluidic oscillator circuit insert has an intake that is in fluid communication with said housing's interior lumen and an outlet that is positioned and configured to project said desired spray pattern outwardly and away from said housing's exterior sidewall;

(d) said sprinkler assembly further including a retention ring adapted for insertion into said housing's interior lumen to provide a snap or friction fit with said first fluidic oscillator circuit insert;

(e) wherein said retention ring fits entirely within said housing lumen and does not change said spray pattern.

2. The sprinkler or irrigation nozzle assembly of claim 1, wherein said sprinkler housing includes a second fluidic-circuit-receiving port defining a second fluid passage between said lumen and said sidewall;

wherein said sprinkler or irrigation nozzle assembly also includes a second fluidic oscillator circuit insert configured to receive irrigation fluid passing into said housing lumen and, in cooperation with said second port, pass irrigation fluid beyond said sidewall, projecting said irrigation fluid in a second desired spray pattern;

wherein said second fluidic circuit insert also has an intake that is in fluid communication with said housing's interior lumen and an outlet that is positioned and configured to project said second desired spray pattern outwardly and away from said housing's exterior sidewall; and wherein said retention ring also provides a snap or friction fit with said second fluidic oscillator circuit insert.

3. The sprinkler or irrigation nozzle assembly of claim 1, wherein said retention ring comprises a spring steel ring.

4. The sprinkler or irrigation nozzle assembly of claim 3, wherein said first fluidic circuit insert has a tail or latch interface defined therein, and wherein said retention ring includes a first tab feature configured to engage said tail or latch interface defined in said first fluidic circuit insert.

5. The sprinkler or irrigation nozzle assembly of claim 4, wherein said tail or latch interface defined in said first fluidic circuit insert has a web or gusset for additional strength.

6. The sprinkler or irrigation nozzle assembly of claim 4, wherein said housing's interior lumen carries the retention ring inserted into said lumen so that said retention ring's first tab feature mates to the tail or latch interface on said first fluidic circuit insert once the first fluidic circuit insert has been installed in said at least one port.

7. The sprinkler or irrigation nozzle assembly of claim 6, wherein said sprinkler housing includes a second fluidic-circuit-receiving port defining a second fluid passage between said lumen and said sidewall;

wherein said sprinkler or irrigation nozzle assembly also includes a second fluidic circuit insert configured to receive irrigation fluid passing into said housing lumen and, in cooperation with said second port, pass irrigation fluid beyond said sidewall, projecting said irrigation fluid in a second desired spray pattern;

wherein said second fluidic circuit insert also has an intake that is in fluid communication with said housing's interior lumen and an outlet that is positioned and configured to project said second desired spray pattern outwardly and away from said housing's exterior sidewall;

wherein said retention ring has a second tab feature and also provides a snap or friction fit with said second fluidic circuit insert and wherein said housing's interior lumen carries the retention ring inserted into said lumen so that said second tab feature mates to a tail or latch interface on said second fluidic circuit insert once the second fluidic insert has been installed in said second port.

8. The sprinkler or irrigation nozzle assembly of claim 7, wherein a slot is cut in each latch point on the retention ring, and each latch point on the retention ring is widened to ensure that the proper level of shear area is retained for stresses and strains on parts subjected to a hydraulic surge mechanical load; and wherein said tab features and a central square opening are configured in the retention ring to avoid disruption of flow conditioning prior to irrigation fluid entry into the inlet of said first fluidic circuit insert.

9. The sprinkler or irrigation nozzle assembly of claim 8, wherein said retention ring is retained in said housing by a snap undercut or groove cut into an interior wall of the housing.

10. The sprinkler or irrigation nozzle assembly of claim 9, wherein said retention ring has a circumferential raised boss or ridge dimensioned to snap-fit into the housing snap undercut or groove, thereby securing the retention ring in place and latching said fluidic circuit inserts in place.

11. The sprinkler or irrigation nozzle assembly of claim 9, wherein said retention ring abuts a filter insert retained within said housing lumen to serve as a backup support to stop the retention ring from flexing or moving under the forces of the hydraulic surge.

\* \* \* \* \*